US012696125B2

(12) United States Patent
Malkin et al.

(10) Patent No.: US 12,696,125 B2
(45) Date of Patent: Jul. 28, 2026

(54) CHANNEL SELECTION BASED ON BANDWIDTH AND TRANSMITTER QUEUE SOJOURN TIME

(71) Applicant: Plume Design, Inc., Palo Alto, CA (US)

(72) Inventors: Yoseph Malkin, San Jose, CA (US); Paul White, Burlingame, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 660 days.

(21) Appl. No.: 17/978,630

(22) Filed: Nov. 1, 2022

(65) Prior Publication Data

US 2024/0147293 A1 May 2, 2024

(51) Int. Cl.
| | |
|---|---|
| *H04W 28/02* | (2009.01) |
| *H04W 24/02* | (2009.01) |
| *H04W 24/08* | (2009.01) |
| *H04W 84/12* | (2009.01) |

(52) U.S. Cl.
CPC ....... *H04W 28/0236* (2013.01); *H04W 24/02* (2013.01); *H04W 24/08* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 9,680,753 | B2 | 6/2017 | Malkin et al. |
| 10,051,455 | B2 | 8/2018 | Jeng et al. |

| | | | |
|---|---|---|---|
| 10,178,578 | B1 | 1/2019 | Mcfarland et al. |
| 10,187,179 | B1 | 1/2019 | Jorgovanovic |
| 10,299,405 | B2 | 5/2019 | Chang et al. |
| 10,420,155 | B2 | 9/2019 | Hu et al. |
| 10,777,877 | B2 | 9/2020 | Su et al. |
| 11,234,166 | B2 | 1/2022 | Mcfarland et al. |
| 2014/0226572 | A1 | 8/2014 | Thota et al. |
| 2014/0286219 | A1 | 9/2014 | Siomina et al. |

(Continued)

OTHER PUBLICATIONS

International Search Report and Written Opinion to corresponding Int'l Appln. No. PCT/US2025/014406 mailed Apr. 7, 20205, 19 pages.

*Primary Examiner* — Rebecca E Song
(74) *Attorney, Agent, or Firm* — Nicholas Martin; Greenberg Traurig, LLP

(57) ABSTRACT

Systems and methods for selecting Wi-Fi channels are provided. A method, according to one implementation, includes obtaining a first measurement of a sojourn time associated with operating a Wi-Fi radio at a first Wi-Fi channel, where the first Wi-Fi channel has a first bandwidth. The sojourn time is a metric related to the length of time that packets are queued before being transmitted within a Wi-Fi network. The method also includes the step of obtaining one or more additional measurements of one or more sojourn times associated with operating the Wi-Fi radio at one or more additional Wi-Fi channels. Each of the one or more additional Wi-Fi channels has a bandwidth that is different from the first bandwidth. Also, the method includes selecting a channel from among the first Wi-Fi channel and the one or more additional Wi-Fi channels based on the bandwidth and sojourn time of each respective channel.

20 Claims, 13 Drawing Sheets

(56)     References Cited

U.S. PATENT DOCUMENTS

| | | | |
|---|---|---|---|
| 2017/0142680 A1 | 5/2017 | Malkin et al. | |
| 2017/0272273 A1 | 9/2017 | Singla et al. | |
| 2017/0366467 A1* | 12/2017 | Martin | H04L 12/4625 |
| 2018/0103505 A1* | 4/2018 | Amini | H04W 84/045 |
| 2018/0227206 A1* | 8/2018 | Bedekar | H04L 43/0847 |
| 2018/0342784 A1 | 11/2018 | Samardzija et al. | |
| 2019/0104411 A1 | 4/2019 | Hotchkiss et al. | |
| 2019/0141570 A1* | 5/2019 | Verma | H04L 5/0007 |
| 2019/0149475 A1* | 5/2019 | Martin | H04L 47/24 |
| | | | 370/235 |
| 2019/0171259 A1 | 6/2019 | Mcfarland et al. | |
| 2019/0174336 A1 | 6/2019 | Mcfarland et al. | |
| 2019/0190808 A1* | 6/2019 | Jordan | H04L 43/0876 |
| 2019/0191385 A1 | 6/2019 | Shinohara et al. | |
| 2019/0342795 A1 | 11/2019 | McFarland et al. | |
| 2020/0322216 A1 | 10/2020 | Singla et al. | |
| 2021/0029559 A1 | 1/2021 | Agarwal et al. | |
| 2021/0067283 A1 | 3/2021 | Hart et al. | |
| 2021/0076216 A1 | 3/2021 | Hotchkiss et al. | |
| 2021/0153210 A1 | 5/2021 | Li et al. | |
| 2021/0195441 A1 | 6/2021 | Agarwal et al. | |
| 2021/0195442 A1 | 6/2021 | Agarwal et al. | |
| 2021/0195443 A1 | 6/2021 | Agarwal et al. | |
| 2021/0352493 A1 | 11/2021 | Meempat et al. | |
| 2022/0217550 A1 | 7/2022 | Sakamoto et al. | |
| 2022/0255799 A1 | 8/2022 | Singla et al. | |
| 2022/0279429 A1 | 9/2022 | Agarwal et al. | |
| 2024/0129493 A1* | 4/2024 | Emmanuel | H04N 7/185 |
| 2024/0137923 A1* | 4/2024 | Ansari | H04W 28/20 |

* cited by examiner

PROVISIONING &
OPTIMIZATION

INTERNET

CLOUD
SERVICE

MODEM/ROUTER

GbE

BACKHAUL LINK

CLIENT LINK

LOCAL SELF ORGANIZATION
TO CONNECT TO CLOUD

_FIG. 3A_

100 104B 104A 14, 18, 20, 22

| CELLULAR RADIOS | WI-FI/BT RADIOS |
| PROCESSOR | LOCAL INTERFACE |
| DATA STORE | NETWORK INTERFACE |

102

106

110

108

POWER

112

_FIG. 3B_

CLOUD SERVICE

40

14, 18, 20, 22

MIDDLEWARE LAYER

150

CHIPSET SPECIFIC FIRMWARE

152

400

Plume CEM Cloud　　40

CLOUD
SERVICE

QoE Analytics

5G Cloud Control Plane　　410

5G CLOUD
CONTROL PLANE

5G

306

402

302

10

404

5G +

16

30A

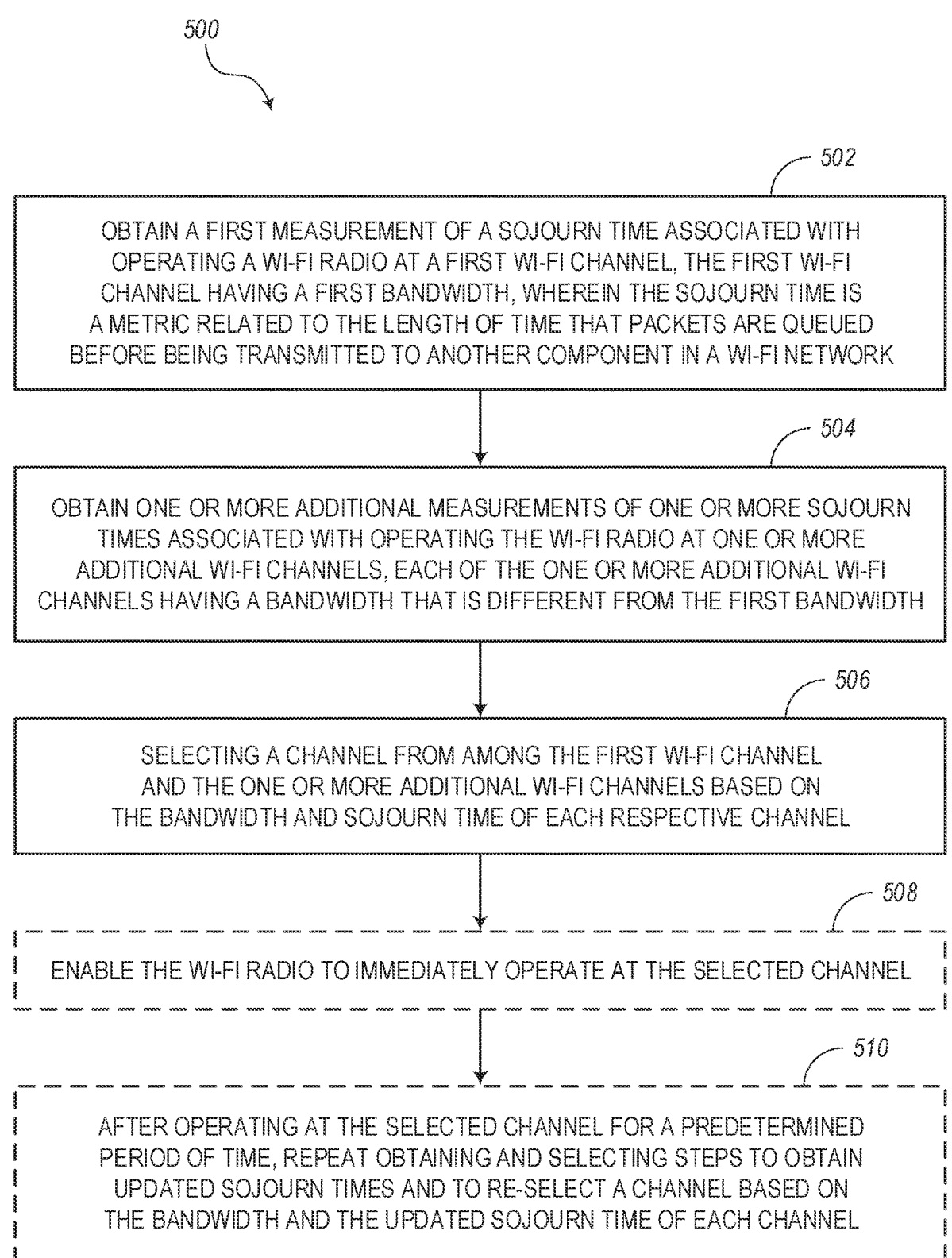

500

502

OBTAIN A FIRST MEASUREMENT OF A SOJOURN TIME ASSOCIATED WITH OPERATING A WI-FI RADIO AT A FIRST WI-FI CHANNEL, THE FIRST WI-FI CHANNEL HAVING A FIRST BANDWIDTH, WHEREIN THE SOJOURN TIME IS A METRIC RELATED TO THE LENGTH OF TIME THAT PACKETS ARE QUEUED BEFORE BEING TRANSMITTED TO ANOTHER COMPONENT IN A WI-FI NETWORK

504

OBTAIN ONE OR MORE ADDITIONAL MEASUREMENTS OF ONE OR MORE SOJOURN TIMES ASSOCIATED WITH OPERATING THE WI-FI RADIO AT ONE OR MORE ADDITIONAL WI-FI CHANNELS, EACH OF THE ONE OR MORE ADDITIONAL WI-FI CHANNELS HAVING A BANDWIDTH THAT IS DIFFERENT FROM THE FIRST BANDWIDTH

506

SELECTING A CHANNEL FROM AMONG THE FIRST WI-FI CHANNEL AND THE ONE OR MORE ADDITIONAL WI-FI CHANNELS BASED ON THE BANDWIDTH AND SOJOURN TIME OF EACH RESPECTIVE CHANNEL

508

ENABLE THE WI-FI RADIO TO IMMEDIATELY OPERATE AT THE SELECTED CHANNEL

510

AFTER OPERATING AT THE SELECTED CHANNEL FOR A PREDETERMINED PERIOD OF TIME, REPEAT OBTAINING AND SELECTING STEPS TO OBTAIN UPDATED SOJOURN TIMES AND TO RE-SELECT A CHANNEL BASED ON THE BANDWIDTH AND THE UPDATED SOJOURN TIME OF EACH CHANNEL

FIG. 10

CHANNEL SELECTION BASED ON BANDWIDTH AND TRANSMITTER QUEUE SOJOURN TIME

FIELD OF THE DISCLOSURE

The present disclosure generally relates to wireless networking systems and methods. More particularly, the present disclosure relates to systems and methods for Wi-Fi networks including channel selection based on bandwidth and transmitter queue sojourn time and using multiple Wi-Fi radios at different frequency bands to maintain full-rate through a leaf node.

BACKGROUND OF THE DISCLOSURE

Wi-Fi networks (i.e., wireless local area networks (WLAN) based on the IEEE 802.11 standards) are ubiquitous, and the primary network used in homes. In fact, Wi-Fi is the most common technique for user device connectivity, and the applications that run over Wi-Fi are continually expanding. For example, Wi-Fi is used to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications. That is, Wi-Fi has become the primary connection between user devices and the Internet in the home or other locations. The vast majority of connected devices use Wi-Fi for their primary network connectivity. As such, there is a need to ensure applications run smoothly over Wi-Fi. There are various optimization techniques for adjusting network operating parameters such as described in commonly assigned U.S. patent application Ser. No. 16/032,584, filed Jul. 11, 2018, and entitled "Optimization of distributed Wi-Fi networks," the contents of which are incorporated by reference herein.

Wi-Fi is continuing to evolve with newer generations of technology, including IEEE 802.11a, 802.11b, 802.11g, 802.11n, 802.11ac, and 802.11ax (referred to as Wi-Fi 6/6E), and future Wi-Fi 7. Each generation of technology evolves the Wi-Fi Media Access Control (MAC) and Physical (PHY) layers to add more capabilities. In the case of IEEE 802.11 ax, orthogonal frequency-division multiple access (OFDMA) has been added as a technique aimed at improving the efficiency of Wi-Fi communication when many small packets are being transmitted to or from multiple client devices. OFDMA can operate both in the downlink (one access point communicating simultaneously to multiple clients), or in the uplink (multiple clients communicating simultaneously to a single access point).

BRIEF SUMMARY OF THE DISCLOSURE

The present disclosure relates to systems and methods for selecting Wi-Fi channels. A process, according to one implementation, includes the step of obtaining a first measurement of a sojourn time associated with operating the Wi-Fi radio at a first Wi-Fi channel. For example, the first Wi-Fi channel has a first bandwidth and the sojourn time, as described above, is a metric related to the length of time that packets are queued before being transmitted to another component in the Wi-Fi network. The process also includes the step of obtaining one or more additional measurements of one or more sojourn times associated with operating the Wi-Fi radio at one or more additional Wi-Fi channels. Each of the one or more additional Wi-Fi channels has a bandwidth that is different from the first bandwidth. Also, the process includes the step of selecting a channel from among the first Wi-Fi channel and the one or more additional Wi-Fi channels based on the bandwidth and sojourn time of each respective channel.

According to additional embodiments, the process may further include the step of enabling the Wi-Fi radio to operate at the selected channel. For example, the first measurement and the one or more additional measurements may be obtained in real time to enable the immediate operation of the Wi-Fi radio at the selected channel. Furthermore, after enabling the Wi-Fi radio to operate at the selected channel for a predetermined period of time, the process may further include repeating the obtaining steps and selecting step to obtain updated sojourn times and to re-select a channel from among the first Wi-Fi channel and the one or more additional Wi-Fi channels based on the bandwidth and the updated sojourn time of each channel.

In addition, the one or more additional Wi-Fi channels may specifically include a second Wi-Fi channel and a third Wi-Fi channel, wherein the bandwidth of each of the second and third Wi-Fi channels is narrower than the first bandwidth of the first Wi-Fi channel. For example, the first bandwidth may correlate to a 160 MHz channel, whereby the second and third bandwidths may correlate to 80 MHz channels. Thus, in this example, the bandwidth of each of the second and third Wi-Fi channels may be half of the first bandwidth. Also, the second and third Wi-Fi channels may be sub-channels of the first Wi-Fi channel. That is, in some cases, the second Wi-Fi channel may include frequencies in the lower half of the first Wi-Fi channel and the third Wi-Fi channel may include frequencies in the upper half of the first Wi-Fi channel. In another example, the bandwidth of each of the second and third Wi-Fi channels is decreased from the first bandwidth via preamble puncturing.

The selecting step may further include the step of analyzing quicker-throughput benefits related to each bandwidth and latency-reduction benefits inversely related to each sojourn time. Then, by weighting the bandwidth and the sojourn time measurements based on the analyzed benefits, the channel can be selected in order to optimize Quality of Experience (QoE). Again, the first Wi-Fi channel and the one or more additional Wi-Fi channels may be chosen from at least the channels available in the 2.4 GHz band, 5 GHz band, and 6 GHz band defined in the Wi-Fi 6E standard and Wi-Fi 7 standard. The first Wi-Fi channel may include a bandwidth equal to 40 MHz, 80 MHz, 160 MHz, or 320 MHz.

The process may also include the step of obtaining application-level parameters based on a detection of an application running on one or more client devices in the Wi-Fi network, the application-level parameters including one or more of application-level latency, application-level jitter, and application traffic class. Then, the process may include selecting the channel based on the bandwidth, sojourn time, and application-level parameters of each respective channel. The Wi-Fi radio described in the process may include at least a chip and a transmitter queue, which may be installed on the chip. The sojourn time may be related to a queue depth in the transmitter queue or an amount of time that packets dwell within the transmitter queue as a result of latency, jitter, traffic delay, and/or interference in the Wi-Fi network. The chip of the Wi-Fi component may then be configured to perform channel selection. Each Wi-Fi components may be configured to transmit packets to the other Wi-Fi components in the Wi-Fi network over backhaul links. Transmission to one or more other components in the Wi-Fi network may include a fronthaul transmission.

The present disclosure further includes systems and methods using multiple Wi-Fi radios at different frequency bands to maintain full rate through a leaf node. Another process, according to one implementation, includes steps that may be executed by a Wi-Fi component. This second process includes detecting when a client device connects to a Wi-Fi component over a new fronthaul link. The process further includes determining the Wi-Fi communication capabilities of the client device. Then, based on the Wi-Fi communication capabilities, the process includes the step of determining which one of the current topology of the Wi-Fi network and a new topology of the Wi-Fi network would result in greater throughput of packets through the Wi-Fi network. The process also includes recognizing whether the new topology would result in greater throughput. If not, then the current topology remains in place and the process ends. Otherwise, when it is determined that the new topology would indeed result in greater throughput, then the process includes the step of adjusting the topology by designating one of the first radio and second radio for communication over the backhaul link and designating the other of the first radio and second radio for communication over the new fronthaul link.

According to additional embodiments, the process may further include the step of causing the first radio to operate at a first channel in the first Wi-Fi band and causing the second radio to operate at a second channel in the second Wi-Fi band. For example, the first Wi-Fi band may include at least a portion of the 5 GHz band as defined in the Wi-Fi 6E and Wi-Fi 7 standards and the second Wi-Fi band may include at least a portion of the 6 GHz band as defined in the Wi-Fi 6E and Wi-Fi 7 standards. When it is determined that the Wi-Fi communication capabilities of the client device allows operation in the 6 GHz band, the process 580 may include designating the first radio for communication over the backhaul link and designating the second radio for communication over the new fronthaul link. When it is determined that the Wi-Fi communication capabilities of the client device do not allow operation in the 6 GHz band, the process may include designating the second radio for communication over the backhaul link and designating the first radio for communication over the new fronthaul link.

In some embodiments, the Wi-Fi component may include a third radio operating in a third Wi-Fi band that is different from the first and second Wi-Fi bands. The third radio may be configured for communication over one or more additional fronthaul links. In some embodiments, the third radio may be an adjustable radio operating at any channel in one or more of the 2.4 GHz band, 5 GHz band, and 6 GHz band as defined in the Wi-Fi 6E and Wi-Fi 7 standards.

Furthermore, the process may determine which one of the current topology and the new topology would result in greater throughput based on one or more of: a) multiple parallel streaming capabilities of the client device, b) one or more radios of the client device, c) a location within the Wi-Fi network of a Wi-Fi component to which the client device is connected, and d) a number of other client devices connected to the Wi-Fi component to which the client device is connected. The process may also include the step of adjusting the topology in order to reduce the occurrence of one of the first and second radios being forced to share time for communication on both the backhaul and fronthaul links and in order to reduce a sojourn time that packets are stored in a transmitter queue.

The process may be executed by a Wi-Fi component. In some embodiments, the Wi-Fi component performing the steps of the process may be a gateway device. The process may include the step of sending topology information to one or more leaf nodes for selecting one of the first and second radios to establish one or more backhaul links and for instructing the one or more leaf nodes to utilize the other of the first and second radios to establish respective fronthaul links. In alternative embodiments, the Wi-Fi component performing the steps of the process may be a leaf node and the other Wi-Fi component may be the gateway device or another leaf node. The process may also include the step of detecting when the client device connects to the leaf node over the new fronthaul link after a separate optimization process that establishes the current topology, whereby the step of selecting the new topology may include a re-optimization process.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3A is a block diagram of functional components of the access points, mesh nodes, repeaters, etc., in the Wi-Fi networks of FIG. 1.

FIG. 3B is a logical diagram of the access points, mesh nodes, repeaters, etc. with a middleware layer to enable operation with the cloud service.

FIG. 10 is a flow diagram illustrating a process for selecting Wi-Fi channels.

DETAILED DESCRIPTION OF THE DISCLOSURE

Again, the present disclosure relates to systems and methods for Wi-Fi networks including channel selection based on bandwidth and transmitter queue sojourn time and using multiple Wi-Fi radios at different frequency bands to maintain full-rate through a leaf node.

§ 1.0 Wi-Fi NETWORK TOPOLOGIES

Figure 1:
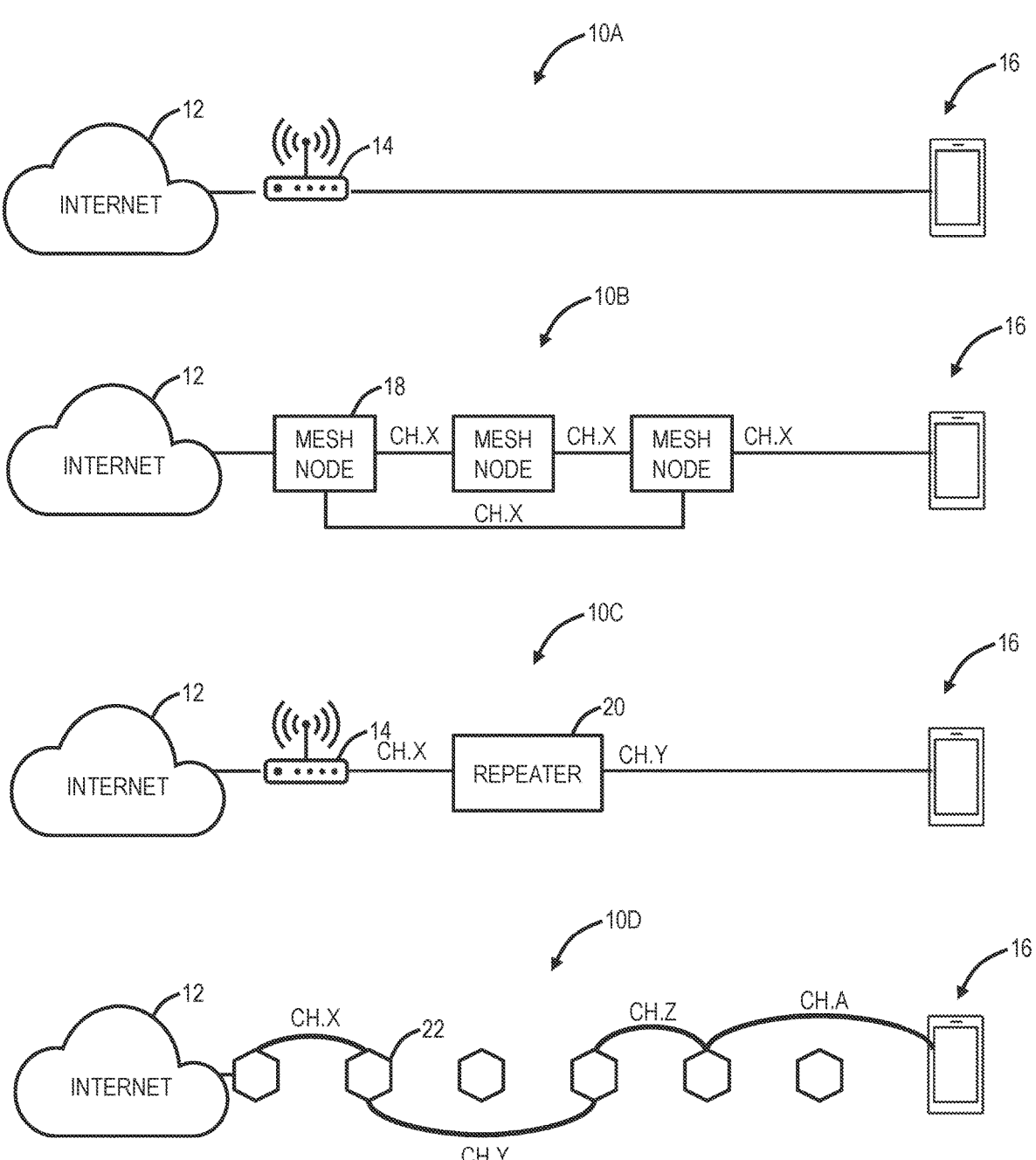
FIG. 1 is a network diagram of various Wi-Fi network topologies for connectivity to the Internet.

FIG. 1 is a network diagram of various Wi-Fi network 10 (namely Wi-Fi networks 10A-10D) topologies for connectivity to the Internet 12. The Wi-Fi network 10 can operate in accordance with the IEEE 802.11 protocols and variations thereof. The Wi-Fi network 10 is deployed to provide coverage in a physical location, e.g., home, business, store, library, school, park, etc. The differences in the topologies of the Wi-Fi networks 10 are that they provide different scope of physical coverage. As described herein and as known in the art, the Wi-Fi network 10 can be referred to as a network, a system, a Wi-Fi network, a Wi-Fi system, a cloud-based Wi-Fi system, etc. The access points 14 and equivalent (i.e., mesh nodes 18, repeater 20, and devices 22) can be referred to as nodes, access points, Wi-Fi nodes, Wi-Fi access points, etc. The objective of the nodes is to provide network connectivity to Wi-Fi client devices 16 which can be referred to as client devices, user equipment, user devices, clients, Wi-Fi clients, Wi-Fi devices, etc. Note, those skilled in the art will recognize the Wi-Fi client devices 16 can be mobile devices, tablets, computers, consumer electronics, home entertainment devices, televisions, Internet of Things (IoT) devices, or any network-enabled device.

The Wi-Fi network 10A includes a single access point 14, which can be a single, high-powered access point 14, which may be centrally located to serve all Wi-Fi client devices 16 in a location. Of course, a typical location can have several walls, floors, etc. between the single access point 14 and the Wi-Fi client devices 16. Plus, the single access point 14 operates on a single channel (or possible multiple channels with multiple radios), leading to potential interference from neighboring systems. The Wi-Fi network 10B is a Wi-Fi mesh network that solves some of the issues with the single access point 14 by having multiple mesh nodes 18, which distribute the Wi-Fi coverage. Specifically, the Wi-Fi network 10B operates based on the mesh nodes 18 being fully interconnected with one another, sharing a channel such as a channel X between each of the mesh nodes 18 and the Wi-Fi client device 16. That is, the Wi-Fi network 10B is a fully interconnected grid, sharing the same channel, and allowing multiple different paths between the mesh nodes 18 and the Wi-Fi client device 16. However, since the Wi-Fi network 10B uses the same backhaul channel, every hop between source points divides the network capacity by the number of hops taken to deliver the data. For example, if it takes three hops to stream a video to a Wi-Fi client device 16, the Wi-Fi network 10B is left with only ⅓ the capacity.

The Wi-Fi network 10C includes the access point 14 coupled wirelessly to a Wi-Fi repeater 20. The Wi-Fi network 10C with the repeaters 20 is a star topology where there is at most one Wi-Fi repeater 20 between the access point 14 and the Wi-Fi client device 16. From a channel perspective, the access point 14 can communicate to the Wi-Fi repeater 20 on a first channel, Ch. X, and the Wi-Fi repeater 20 can communicate to the Wi-Fi client device 16 on a second channel, Ch. Y. The Wi-Fi network 10C solves the problem with the Wi-Fi mesh network of requiring the same channel for all connections by using a different channel or band for the various hops (note, some hops may use the same channel/band, but it is not required), to prevent slowing down the Wi-Fi speed. One disadvantage of the repeater 20 is that it may have a different service set identifier (SSID), from the access point 14, i.e., effectively different Wi-Fi networks from the perspective of the Wi-Fi client devices 16.

Despite Wi-Fi's popularity and ubiquity, many consumers still experience difficulties with Wi-Fi. The challenges of supplying real-time media applications, like those listed above, put increasing demands on the throughput, latency, jitter, and robustness of Wi-Fi. Studies have shown that broadband access to the Internet through service providers is up 99.9% of the time at high data rates. However, despite the Internet arriving reliably and fast to the edge of consumer's homes, simply distributing the connection across the home via Wi-Fi is much less reliable leading to poor user experience.

Several issues prevent conventional Wi-Fi systems from performing well, including i) interference, ii) congestion, and iii) coverage. For interference, with the growth of Wi-Fi has come the growth of interference between different Wi-Fi networks which overlap. When two networks within range of each other carry high levels of traffic, they interfere with each other, reducing the throughput that either network can achieve. For congestion, within a single Wi-Fi network, there may be several communications sessions running. When several demanding applications are running, such as high-definition video streams, the network can become saturated, leaving insufficient capacity to support the video streams.

For coverage, Wi-Fi signals attenuate with distance and when traveling through walls and other objects. In many environments, such as residences, reliable Wi-Fi service cannot be obtained in all rooms. Even if a basic connection can be obtained in all rooms, many of those locations will have poor performance due to a weak Wi-Fi signal. Various objects in a residence such as walls, doors, mirrors, people, and general clutter all interfere and attenuate Wi-Fi signals leading to slower data rates.

Two general approaches have been tried to improve the performance of conventional Wi-Fi systems, as illustrated in the Wi-Fi networks 1A, 10B, 10C. The first approach (the Wi-Fi network 10A) is to simply build more powerful single access points, in an attempt to cover a location with stronger signal strengths, thereby providing more complete coverage and higher data rates at a given location. However, this approach is limited by both regulatory limits on the allowed transmit power, and by the fundamental laws of nature. The difficulty of making such a powerful access point, whether by increasing the power, or increasing the number of transmit and receive antennas, grows exponentially with the achieved improvement. Practical improvements using these techniques lie in the range of 6 to 12 dB. However, a single additional wall can attenuate by 12 dB. Therefore, despite the huge difficulty and expense to gain 12 dB of the link budget, the resulting system may not be able to transmit through even one additional wall. Any coverage holes that may have existed will still be present, devices that suffer poor throughput will still achieve relatively poor throughput, and the overall system capacity will be only modestly improved. In addition, this approach does nothing to improve the situation with interference and congestion. In fact, by increasing the transmit power, the amount of interference between networks actually goes up.

A second approach is to use repeaters or a mesh of Wi-Fi devices to repeat the Wi-Fi data throughout a location, as illustrated in the Wi-Fi networks 10B, 10C. This approach is a fundamentally better approach to achieving better coverage. By placing even a single repeater 20 in the center of a house, the distance that a single Wi-Fi transmission must traverse can be cut in half, halving also the number of walls that each hop of the Wi-Fi signal must traverse. This can make a change in the link budget of 40 dB or more, a huge change compared to the 6 to 12 dB type improvements that can be obtained by enhancing a single access point as described above. Mesh networks have similar properties as systems using Wi-Fi repeaters 20. A fully interconnected mesh adds the ability for all the mesh nodes 18 to be able to communicate with each other, opening the possibility of packets being delivered via multiple hops following an arbitrary pathway through the network.

The Wi-Fi network 10D includes various Wi-Fi devices 22 that can be interconnected to one another wirelessly (Wi-Fi wireless backhaul links) or wired, in a tree topology where there is one path between the Wi-Fi client device 16 and the gateway (the Wi-Fi device 22 connected to the Internet), but which allows for multiple wireless hops unlike the Wi-Fi repeater network and multiple channels unlike the Wi-Fi mesh network. For example, the Wi-Fi network 10D can use different channels/bands between Wi-Fi devices 22 and between the Wi-Fi client device 16 (e.g., Ch. X, Y, Z, A), and, also, the Wi-Fi system 10 does not necessarily use every Wi-Fi device 22, based on configuration and optimization. The Wi-Fi network 10D is not constrained to a star topology as in the Wi-Fi repeater network which at most allows two wireless hops between the Wi-Fi client device 16 and a gateway. Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the Wi-Fi network 10D. By selecting different Wi-Fi channels between the Wi-Fi devices 22, interference and congestion can be avoided or minimized.

Of note, the systems and methods described herein contemplate operation through any of the Wi-Fi networks 10, including other topologies not explicated described herein. Also, if there are certain aspects of the systems and methods which require multiple nodes in the Wi-Fi network 10, this would exclude the Wi-Fi network 10A.

§ 1.1 Cloud-Based Control

Figure 2A:
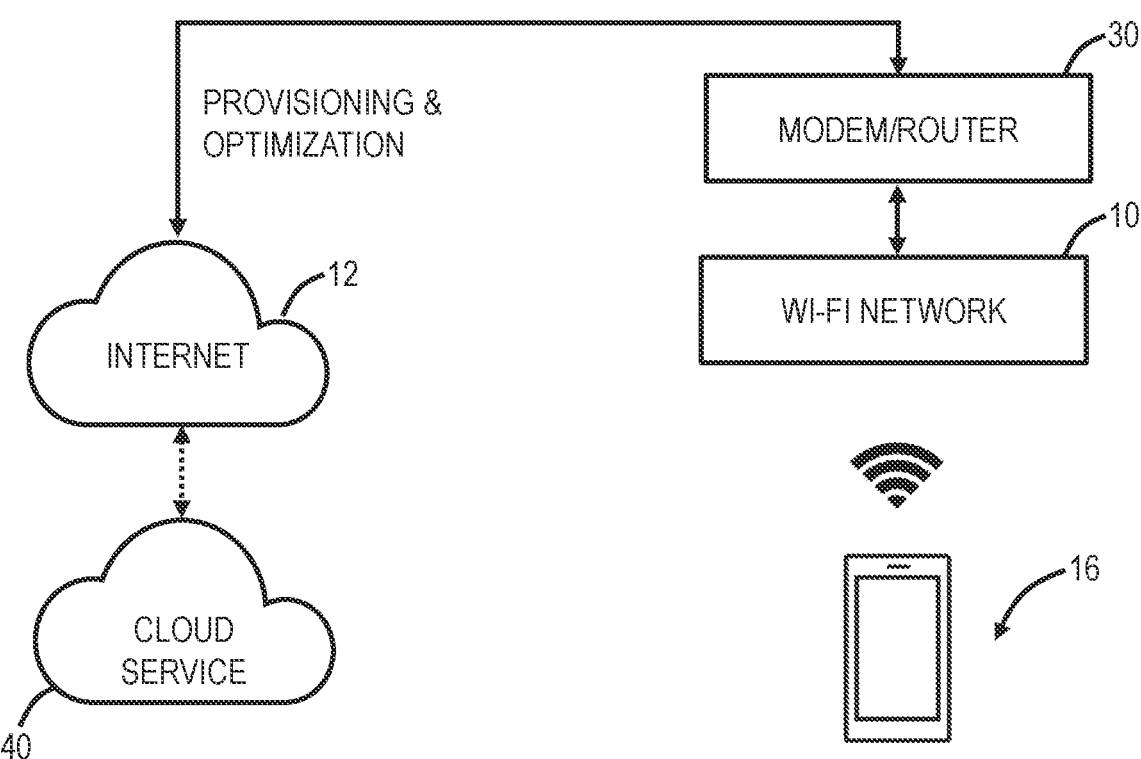
FIG. 2A is a network diagram of the Wi-Fi network with cloud-based control.

FIG. 2A is a network diagram of the Wi-Fi network 10 with cloud-based control. The Wi-Fi network 10 includes a gateway device which is any of the access points 14, the mesh node 18, or the Wi-Fi device 22 that connects to a modem/router 30 that is connected to the Internet 12. For external network connectivity, the modem/router 30 which can be a cable modem, Digital Subscriber Loop (DSL) modem, cellular interface, or any device providing external network connectivity to the physical location associated with the Wi-Fi network 10. In an embodiment, the Wi-Fi network 10 can include centralized control such as via a cloud service 40 located on the Internet 12 and configured to control multiple Wi-Fi networks 10. The cloud service 40 can receive measurement data, analyze the measurement data, and configure the nodes in the Wi-Fi network 10 based thereon. This cloud-based control is contrasted with a conventional operation that relies on a local configuration such as by logging in locally to an access point.

Of note, cloud-based control can be implemented with any of the Wi-Fi networks 10, with monitoring through the cloud service 40. For example, different vendors can make access points 14, mesh nodes 18, repeaters 20, Wi-Fi devices 22, etc. However, it is possible for unified control via the cloud using standardized techniques for communication with the cloud service 40. One such example includes OpenSync, sponsored by the Applicant of the present disclosure and described at www.opensync.io/documentation. OpenSync is cloud-agnostic open-source software for the delivery, curation, and management of services for the modern home. That is, this provides standardization of the communication between devices and the cloud service 40. OpenSync acts as silicon, Customer Premises Equipment (CPE), and cloud-agnostic connection between the in-home hardware devices and the cloud service 40. This is used to collect measurements and statistics from the connected Wi-Fi client devices 16 and network management elements, and to enable customized connectivity services.

As described herein, cloud-based management includes reporting of Wi-Fi related performance metrics to the cloud service 40 as well as receiving Wi-Fi-related configuration parameters from the cloud service 40. The systems and methods contemplate use with any Wi-Fi network 10. The cloud service 40 utilizes cloud computing systems and methods to abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase SaaS is sometimes used to describe application programs offered through cloud computing. A common shorthand for a provided cloud computing service (or even an aggregation of all existing cloud services) is "the cloud."

§ 1.2 Distributed Wi-Fi Network

Figure 2B:
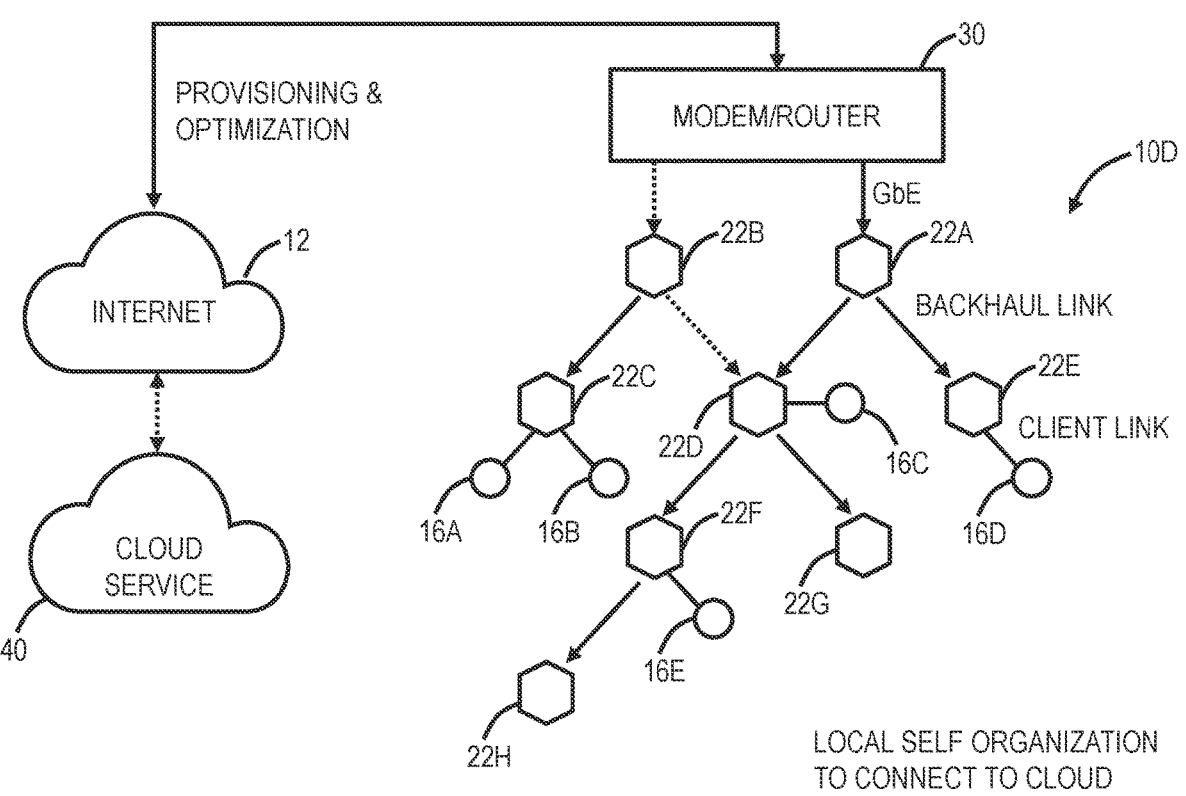
FIG. 2B is a network diagram of an example implementation of the Wi-Fi network, as a distributed Wi-Fi network in a tree topology.

FIG. 2B is a network diagram of an example implementation the Wi-Fi network 10D, as a distributed Wi-Fi network in a tree topology. The distributed Wi-Fi network 10D includes a plurality of access points 22 (labeled as access points 22A-22H) which can be distributed throughout a location, such as a residence, office, or the like. That is, the distributed Wi-Fi 10D contemplates operation in any physical location where it is inefficient or impractical to service with a single access point, repeaters, or a mesh system. In a typical deployment, the distributed Wi-Fi network 10D can include between 1 to 12 access points or more in a home. A large number of access points 22 (which can also be referred to as nodes in the distributed Wi-Fi system 10) ensures that the distance between any access point 22 is always small, as is the distance to any Wi-Fi client device 16 needing Wi-Fi service. That is, an objective of the distributed Wi-Fi network 10D is for distances between the access points 22 to be of similar size as distances between the Wi-Fi client devices 16 and the associated access point 22. Such small distances ensure that every corner of a consumer's home is well covered by Wi-Fi signals. It also ensures that any given hop in the distributed Wi-Fi network 10D is short and goes through few walls. This results in very strong signal strengths for each hop in the distributed Wi-Fi network 10D, allowing the use of high data rates, and providing robust operation.

For external network connectivity, one or more of the access points 14 can be connected to a modem/router 30 which can be a cable modem, Digital Subscriber Loop (DSL) modem, or any device providing external network connectivity to the physical location associated with the distributed Wi-Fi network 10D.

While providing excellent coverage, a large number of access points 22 (nodes) presents a coordination problem. Getting all the access points 22 configured correctly and communicating efficiently requires centralized control. This control is preferably done via the cloud service 40 that can be reached across the Internet 12 and accessed remotely such as through an application ("app") running on a client device 16. That is, in an exemplary aspect, the distributed Wi-Fi network 10D includes cloud-based control (with a cloud-based controller or cloud service) to optimize, configure, and monitor the operation of the access points 22 and the Wi-Fi client devices 16. This cloud-based control is contrasted with a conventional operation which relies on a local configuration such as by logging in locally to an access point. In the distributed Wi-Fi network 10D, the control and optimization does not require local login to the access point 22, but rather the Wi-Fi client device 16 communicating with the cloud service 4, such as via a disparate network (a different network than the distributed Wi-Fi network 10D) (e.g., LTE, another Wi-Fi network, etc.).

The access points 22 can include both wireless links and wired links for connectivity. In the example of FIG. 2B, the access point 22A has an exemplary gigabit Ethernet (GbE) wired connection to the modem/router 30. Optionally, the access point 22B also has a wired connection to the modem/router 30, such as for redundancy or load balancing. Also, the access points 22A, 22B can have a wireless connection to the modem/router 30. Additionally, the access points 22A, 22B can have a wireless gateway such as to a cellular provider as is described in detail herein. The access points 22 can have wireless links for client connectivity (referred to as a client link) and for backhaul (referred to as a backhaul link). The distributed Wi-Fi network 10D differs from a conventional Wi-Fi mesh network in that the client links and the backhaul links do not necessarily share the same Wi-Fi channel, thereby reducing interference. That is, the access points 22 can support at least two Wi-Fi wireless channels— which can be used flexibly to serve either the client link or the backhaul link and may have at least one wired port for connectivity to the modem/router 30, or for connection to other devices. In the distributed Wi-Fi network 10D, only a small subset of the access points 22 require direct connectivity to the modem/router 30 with the non-connected access points 22 communicating with the modem/router 30 through the backhaul links back to the connected access points 22A, 22B. Of course, the backhaul links may also be wired Ethernet connections, such as in a location have a wired infrastructure.

§ 2.0 ACCESS POINT

FIG. 3A is a block diagram of functional components of the access points 14, mesh nodes 18, repeaters 20, etc. ("node") in the Wi-Fi networks 10. The node includes a physical form factor 100 which contains a processor 102, a plurality of radios 104A, 104B, a local interface 106, a data store 108, a network interface 110, and power 112. It should be appreciated by those of ordinary skill in the art that FIG. 3A depicts the node in an oversimplified manner, and a practical embodiment may include additional components and suitably configured processing logic to support features described herein or known or conventional operating features that are not described in detail herein.

In an embodiment, the form factor 100 is a compact physical implementation where the node directly plugs into an electrical socket and is physically supported by the electrical plug connected to the electrical socket. This compact physical implementation is ideal for a large number of nodes distributed throughout a residence. The processor 102 is a hardware device for executing software instructions. The processor 102 can be any custom made or commercially available processor, a central processing unit (CPU), an auxiliary processor among several processors, a semiconductor-based microprocessor (in the form of a microchip or chipset), or generally any device for executing software instructions. When the node is in operation, the processor 102 is configured to execute software stored within memory or the data store 108, to communicate data to and from the memory or the data store 108, and to generally control operations of the access point 14 pursuant to the software instructions. In an embodiment, the processor 102 may include a mobile optimized processor such as optimized for power consumption and mobile applications.

The radios 104A enable wireless communication in the Wi-Fi network 10. The radios 104B can operate according to the IEEE 802.11 standard. The radios 104B support cellular connectivity such as Long-Term Evolution (LTE), 5G, and the like. The radios 104A, 104B include address, control, and/or data connections to enable appropriate communications on the Wi-Fi network 10 and a cellular network, respectively. As described herein, the node can include a plurality of radios 104A to support different links, i.e., backhaul links and client links. The radios 104A can also include Wi-Fi chipsets configured to perform IEEE 802.11 operations. In an embodiment, an optimization can determine the configuration of the radios 104B such as bandwidth, channels, topology, etc. In an embodiment, the node supports dual-band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the node can support IEEE 802.11AC1200 gigabit Wi-Fi (300+867 Mbps). Also, the node can support additional frequency bands such as 6 GHz, as well as cellular connections. The radios 104B can include cellular chipsets and the like to support fixed wireless access.

Also, the radios 104A, 104B include antennas designed to fit in the form factor 100. An example is described in commonly-assigned U.S. patent Ser. No. 17/857,377, entitled "Highly isolated and barely separated antennas integrated with noise free RF-transparent Printed Circuit Board (PCB) for enhanced radiated sensitivity," filed Jul. 5, 2022, the contents of which are incorporated by reference in their entirety.

The local interface 106 is configured for local communication to the node and can be either a wired connection or wireless connection such as Bluetooth or the like. Since the node can be configured via the cloud service 40, an onboarding process is required to first establish connectivity for a newly turned on node. In an embodiment, the node can also include the local interface 106 allowing connectivity to a Wi-Fi client device 16 for onboarding to the Wi-Fi network 10 such as through an app on the user device 16. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the node. The network interface 110 may be used to enable the node communicates to the modem/router 30. Also, the network interface 110 can be used to provide local connectivity to a Wi-Fi client device 16 or another access point 22. For example, wiring in a device to a node can provide network access to a device that does not support Wi-Fi. In an embodiment, all of the nodes in the Wi-Fi network 10D include the network interface 110. In another embodiment, select nodes, which connect to the modem/router 30 or require local wired connections have the network interface 110. The network interface 110 may include, for example, an Ethernet card or adapter (e.g., 10BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the node, data gathering and measurement control, data management, memory management, and communication and control interfaces with the cloud service 40. The processor 102 and the data store 108 may be configured to implement the various processes, algorithms, methods, techniques, etc. described herein.

Also, those skilled in the art will appreciate there can be various physical implementations which are contemplated herein. For example, in some embodiments, the modem/router 30 can be integrated with the access point 14, 18, 22. In other embodiments, just a router can be integrated with the access point 14, 18, 22 with separate connectivity to a modem.

§ 2.1 OpenSync

FIG. 3B is a logical diagram of the access points 14, mesh nodes 18, repeaters 20, etc. ("node") with a middleware layer 150 to enable operation with the cloud service 40. Of note, the present disclosure contemplates use with any vendor's hardware for the access points 14, mesh nodes 18, repeaters 20, etc. with the addition of the middleware layer 150 that is configured to operate with chipset specific firmware 152 in the node. In an embodiment, the middleware layer 150 is OpenSync, such as describe in www.opensync.io/documentation, the contents of which are incorporated by reference. Again, OpenSync is cloud-agnostic open-source software for the delivery, curation, and management of services for the modern home. That is, this provides standardization of the communication between devices and the cloud service 40. OpenSync acts as silicon, Customer Premises Equipment (CPE), and cloud-agnostic connection between the in-home hardware devices and the cloud service 40.

The middleware layer 150 spans across layers from just above the firmware drivers to the cloud connection for the cloud service 40. The middleware layer 150 is software operates with the following device segments:

Measurements/Statistics/Telemetry

Collecting measurements reported by the low-level drivers

Compiling and pre-processing the measurements into statistics that are uniform across different devices Presenting the statistics using standardized formats Preparing the formatted statistics for transfer to the cloud using serialization and packetizing Communicating the statistics to the cloud using standardized and efficient telemetry Management/Control Defining a standard interface for control messaging from the cloud service 40

Providing operations necessary to manage the services, such as onboarding and provisioning Providing rules-based networking configurations to block, filter, forward, and prioritize the messages Implementing software to manage the device maintenance functions, including logging, firmware upgrades, and debugging Cloud-Managed Services Wi-Fi, including mesh networks that dynamically adapt to their environments User access management Cybersecurity Parental controls IoT device management Additional services Through use of the middleware layer 150, it is possible to have various different vendor devices operate with the cloud service 40.

§ 2.2 Virtual Network Functions (VNF) on the Access Points

In addition to the middleware layer 150, the present disclosure contemplates the ability for the cloud service 40 to add applications, features, etc. on the nodes. In the present disclosure, the node is configured to maintain tunnels to the corporate network as well as support forwarding based on virtual networks.

§ 2.3 SDN and OpenFlow

In an embodiment, the cloud service 40 can use software defined network (SDN) such as via OpenFlow to control the Wi-Fi networks 10 and the corresponding access points. OpenFlow is described at opennetworking.org and is a communications protocol that gives access to the forwarding plane of a network switch or router over the network. In this case, the forwarding plane is with the access points and the network is the Wi-Fi network 10. The access points and the cloud service can include with OpenFlow interfaces and Open vSwitch Database Management Protocol (OVSDB) interfaces. The cloud service 40 can use a transaction oriented reliable communication protocol such as Open vSwitch Database Management Protocol (OVSDB) to interact with the Wi-Fi networks 10.

The present disclosure includes multiple virtual networks in the Wi-Fi network 10 and one implementation can include SDN such as via OpenFlow.

§ 3.0 CLOUD SERVER AND USER DEVICE

Figure 4:
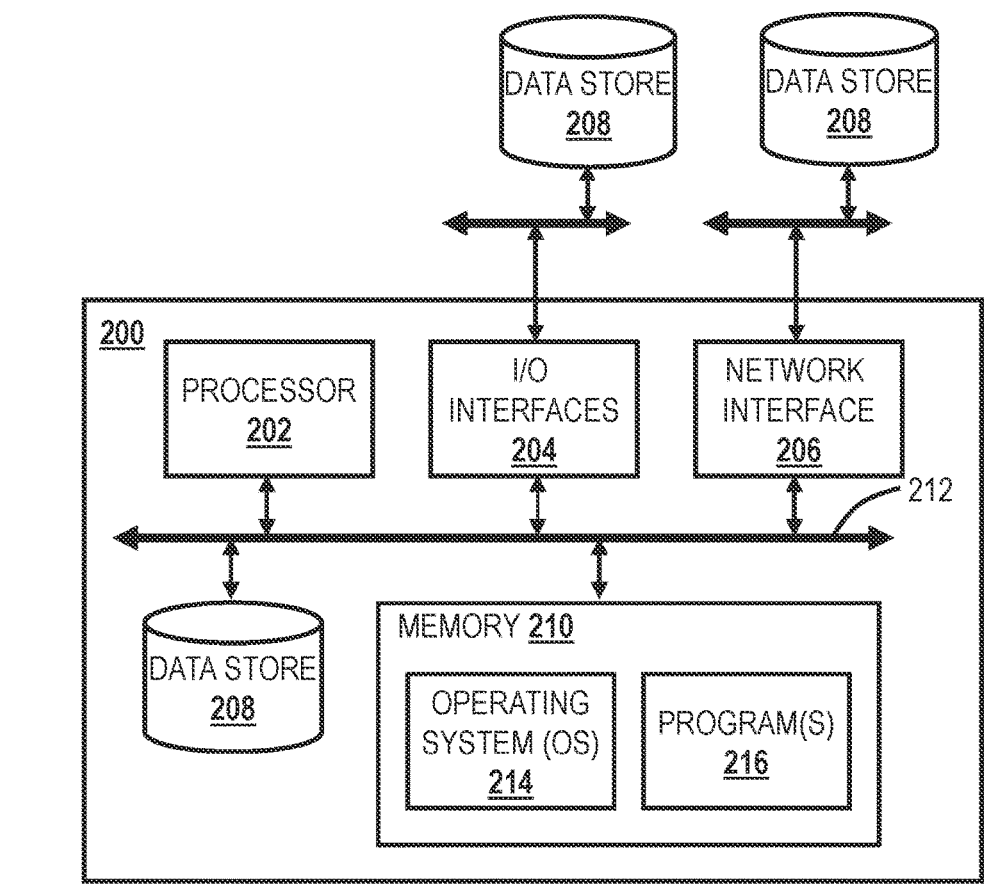
FIG. 4 is a block diagram of functional components of a server, a Wi-Fi client device, or a user device that may be used with the Wi-Fi network of FIG. 1 and/or the cloud-based control of FIG. 2A.

FIG. 4 is a block diagram of functional components of a server 200, a Wi-Fi client device 16, or a user device that may be used with the Wi-Fi network of FIG. 1 or 2B, and/or the cloud-based control of FIG. 2A. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. The user input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fiber channel, InfiniBand, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the cloud service 40. The network interface 206 may include, for example, an Ethernet card or adapter (e.g., 10BaseT, Fast Ethernet, Gigabit Ethernet, 10GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, such as related to the optimization.

§ 4.0 Wi-Fi NETWORK WITH WIRED AND WIRELESS CONNECTIVITY

Again, the wireless access points 14, 18, 22 include both the Wi-Fi radios 104A, the cellular radios 104B, and the network interface 110. The network interface 110 can include an Ethernet connection to the modem/router 30. In an embodiment, the cellular radios 104B can provide a backup connection to the Ethernet connection, for connectivity to the Internet. Of note, the access point 14, 18, 22 with the cellular radios 104B can be referred to as a gateway 30A node. That is, the term gateway 30A is meant to cover any access point 14, 18, 22, modem/router, etc. or combination thereof that enables connectivity to the Internet 12 for the Wi-Fi network 10. Note, in some embodiments, a modem is separate from the access point 14, 18, 22. In other embodiments, the access point 14, 18, 22, include a router. In still other embodiments, the access point 14, 18, 22 can include a modem/router. Those skilled in the art will recognize various approaches are contemplated and all such equivalents are considered herewith.

Figure 5:
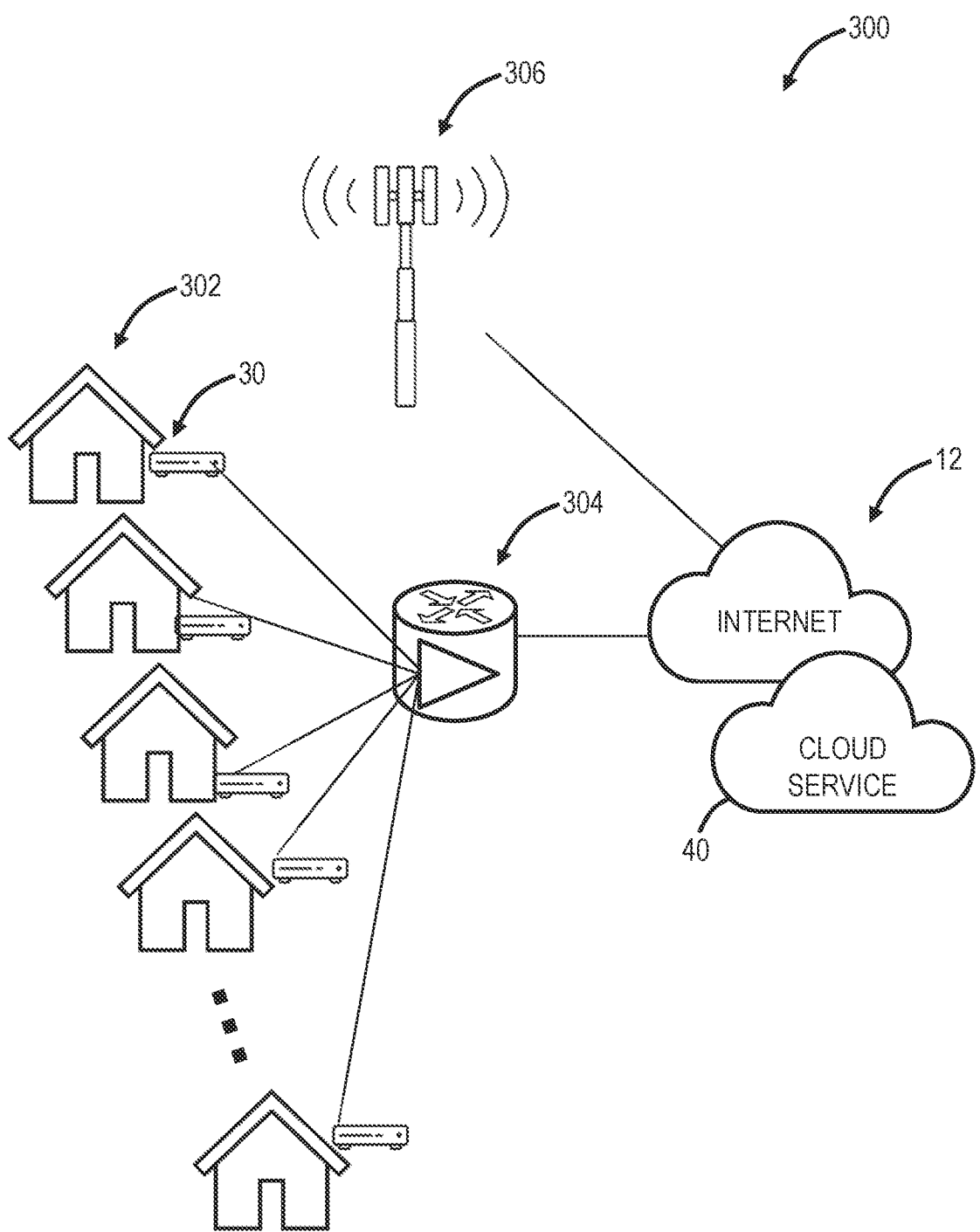
FIG. 5 is a network diagram of a portion of a network associated with a network operator.

FIG. 5 is a network diagram of a portion of a network 300 associated with a network operator. In this example, the network operator includes both wired and wireless broadband in the same geographical area, represented by homes 302. For example, the wired broadband can be via modems/routers 30 that can connect ultimately to a cable modem termination system (CMTS) 304 (or some other type of wired infrastructure, e.g., DSL, Passive Optical Network (PON), Hybrid Fiber Coax (HFC), etc.), and the wireless broadband can be via fixed wireless access via the cellular radios 104B in the access points 14, 18, 22 that connect to a base station 306 (e.g., eNodeB, gNodeB, etc.). It would be advantageous to support failover to the wireless broadband in the case of a wired broadband failure, providing reliability, uptime, and high service level agreement (SLA) support. In the case of a single outage, this is not an issue on the wireless network. However, often wired failures are geographically localized. For example, failure of the CMTS 304 causes a burden on the base station 306 because the wired broadband failure is geographically localized to the homes 302. This could dramatically put a burden on the base station 306 or other cellular cells in the area, leading to degradation of services for all mobile users in the area. That is, wired broadband outages tend to be localized and using wireless broadband for failover could inundate the cellular network.

§ 4.1 Fixed Wireless Access System

Figure 6:
FIG. 6 is a diagram of a fixed wireless access system for wired and/or wireless connectivity.

FIG. 6 is a diagram of a fixed wireless access system 400 for wired and/or wireless connectivity. For illustration purposes, the fixed wireless access system 400 is illustrated with a single home 302 having a modem/router 30 and a Wi-Fi client device 16. Those skilled in the art will recognize the fixed wireless access system 400 contemplates multiple locations, including homes, businesses, store, library, mall, sporting area, or any location where a Wi-Fi network 10 is deployed. Further, the fixed wireless access system 400 contemplates use with various different Wi-Fi networks 10, with various different network operators, etc. Also, the fixed wireless access system 400 contemplates use with any of the various wired and/or wireless connectivity schemes described herein.

The cloud service 40 is configured to connect to the Wi-Fi network 10, either via a wired connection 402 and/or a wireless connection 404. In an embodiment, the cloud service 40 can be utilized for configuration, monitoring, and reporting of the Wi-Fi networks 10 in the homes 302 or other locations. The cloud service 40 can be configured to detect outages such as for the wired connections 402. For example, this functionality is described in commonly-assigned U.S. patent application Ser. No. 17/700,782, filed Mar. 22, 2022, and entitled "Intelligent monitoring systems and methods for Wi-Fi Metric-Based ISP Outage Detection for Cloud Based Wi-Fi Networks," the contents of which are incorporated by reference in their entirety.

Also, the cloud service 40 can connect to a 5G cloud control plane 410 and can determine 5G to Wi-Fi quality of experience (QoE) monitoring and application prioritization controls for increased service consistency. QoE analytics can be shared with 5G cloud control plane 410 for network optimization feedback.

In an embodiment, the access points 14, 18, 20, 22 and/or gateway 30A can include OpenSync support for communicating with the cloud service 40.

§ 5.0 SELECTING A Wi-Fi CHANNEL BASED ON BANDWIDTH AND SOJOURN TIME

The present disclosure is further directed to systems and methods to enable the dynamic selection of a Wi-Fi channel to avoid traffic stalls due to interference in part of the band. Ideally, when a Wi-Fi chip operates at a channel having wide bandwidth (e.g., 160 MHz), dynamic channel selection can avoid congestion and interference in a part of the channel. However, some Wi-Fi chips may wait for the entire 160 MHz to be cleared before they send packets to a 160 MHz client device.

Without knowing the interference in all the sub-channels, it may be difficult to know when it may be advantageous to drop to a channel having narrower bandwidth. In this case, "dropping down" may refer to utilizing a portion of a primary channel that is represented as a different channel. For example, in the 5 GHz band, channel 42 is an 80 MHz channel ranging from 5170 MHz to 5250 MHz. If there is interference on this channel 42, it may be advantageous to use a sub-channel from of this channel. That is, a controller may choose either the lower-frequency 40 MHz channel, designated as channel 38 and ranging from 5170 MHz to 5210 MHz, or the higher-frequency 40 MHz channel, designed as channel 46 and ranging from 5210 MHz to 5250 MHz. Since one of these may include interference, the controller can select the less-busy 40 MHz channel. Once the interference is reduced or eliminated, the controller may then switch back to the wider 80 MHz channel to optimize throughout.

Figure 7:
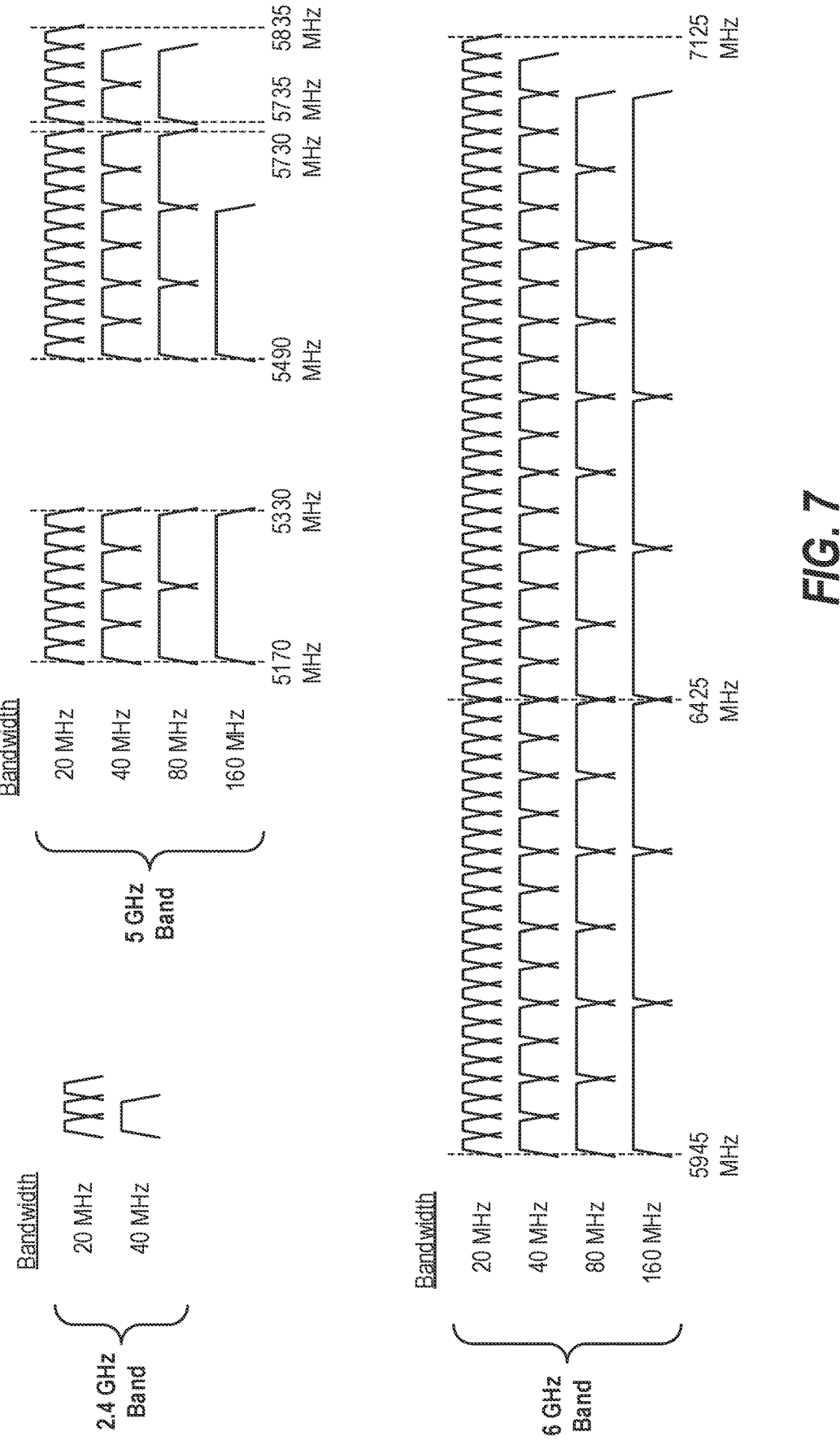
FIG. 7 is a diagram illustrating an example of the Wi-Fi channel allocation showing the available channels in the U.S. as defined by the Wi-Fi 6E and Wi-Fi 7 standards.

FIG. 7 is a diagram illustrating an example of the Wi-Fi channel allocation showing the available channels in the U.S. as defined by the Wi-Fi 6E and Wi-Fi 7 standards. It may be noted that, under these Wi-Fi standards, other countries or jurisdictions may allow the use of different channels. The Wi-Fi channel allocation of FIG. 7 includes a first set of channels that are part of the 2.4 GHz band, a second set of channels that are part of the 5 GHz band, and a third set of channels that are part of the 6 GHz band. It may be noted that the introduction of the 6 GHz band thereby represents a very large increase in the allocation of new spectrum available for Wi-Fi systems.

It may be noted that the Wi-Fi 7 standard and later Wi-Fi standards may additionally include one or more 320 MHz channels and/or channels having other bandwidths. It should therefore be understood that the systems and methods of the present disclosure are believed to be applicable to any frequency bands having any number of channels (overlapping or non-overlapping) with any suitable bandwidths.

As shown in the Wi-Fi channel allocation of FIG. 7, and in accordance with Wi-Fi 6E and Wi-Fi 7, the 2.4 GHz band includes three channels having a bandwidth of 20 MHz and one channel having a bandwidth of 40 MHz. The 5 GHz band includes 25 channels having a bandwidth of 20 MHz, 12 channels having a bandwidth of 40 MHz, 6 channels having a bandwidth of 80 MHz, and 2 channels having a bandwidth of 160 MHz. The 5 GHz band includes an empty portion of spectrum between 5330 MHz and 5490 MHz, which may be used for filtering purposes. The 6 GHz band includes 59 channels having a bandwidth of 20 MHz, 29 channels having a bandwidth of 40 MHz, 14 channels having a bandwidth of 80 MHz, and 7 channels having a bandwidth of 160 MHz. It should be noted that the 20 MHz, 40 MHz, 80 MHz, and 160 MHz channels include overlap. That is, each 40 MHz channel may also be represented by two 20 MHz channels, each 80 MHz channel may also be represented by two 40 MHz channels, and each 160 MHz channel may also be represented by two 80 MHz channels.

Figure 8:
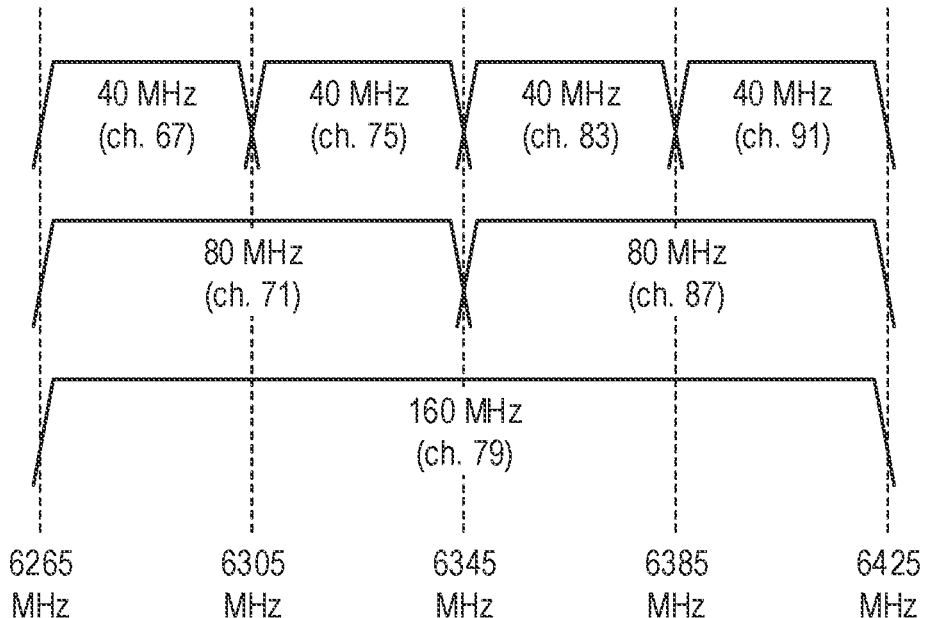
FIG. 8 is a diagram showing an example of overlapping channels in a slice of the 6 GHz band ranging from 6265 MHz to 6426 MHz.

FIG. 8 is a diagram showing an example of overlapping channels in a slice of the 6 GHz band ranging from 6265 MHz to 6426 MHz. As shown in this example, this entire slice covers one 160 MHz channel, which is designated in the Wi-Fi standards as "channel 79" in the 6 GHz band and ranges from 6265 MHz to 6425 MHz. This slice also corresponding to two 80 MHz channels, which are designated in the Wi-Fi standards as "channel 71" and "channel 87" in the 6 GHz band, where the first 80 MHz channel (i.e., channel 71) ranges from 6265 MHz to 6345 MHz and the second 80 MHz channel (i.e., channel 87) ranges from 6345 MHz to 6425 MHz. This slice also corresponding to four 40 MHz channels, which are designated in the Wi-Fi standards as "channel 67," "channel 75," "channel 83," and "channel 91" in the 6 GHz band. The first 40 MHz channel (i.e., channel 67) ranges from 6265 MHz to 6305 MHz; the second 40 MHz channel (i.e., channel 75) ranges from 6305 MHz to 6345 MHz; the third 40 MHz channel (i.e., channel 83) ranges from 6345 MHz to 6385 MHz; and the fourth 40 MHz channel (i.e., channel 91) ranges from 6385 MHz to 6425 MHz. This slice also includes 20 MHz channels, which are not shown in this figure.

Again, a controller may be used to select channels according to the various embodiments of the present disclosure. In some embodiments, the controller may select a channel (e.g., channel 79) having a wider bandwidth (e.g., 160 MHz) and may then select subdivisions of this channel as needed to avoid interference. That is, the controller may select one of the 80 MHz channels (e.g., either one of channels 71 or 87) if there is interference on the wider channel. Alternatively, the controller may select one or more of the four 40 MHz channels (e.g., channels 67, 75, 83, 91) if there is interference on the wider channel or lower-width 80 MHz channel.

The selection of channels may be based on the bandwidth of each channel. For example, when there is no interference in a Wi-Fi network, a channel with the wider bandwidth will be able to carry twice as many packets from one Wi-Fi device to another as a channel having half of its bandwidth. That is, a 160 MHz channel will normally enable twice the throughput than an 80 MHz channel. However, if there is any type of interference on the 160 MHz channel, then it may be beneficial to utilize an 80 MHz channel or 40 MHz channel. The interference, as described in various embodiments in the present disclosure, may be determined as a factor of the "sojourn time," which is the amount of time that packets remain in a transmitter queue before they are able to be sent to another Wi-Fi component. Thus, the embodiments of the present disclosure are configured to measure the transmitter queue time or sojourn time associated with each of the various channels, whereby the bandwidth and sojourn time information can be used in the selection of channels for optimizing the Wi-Fi network (i.e., enabling the most throughout as possible).

One idea is to note the amount of time that the packets spend in the Wi-Fi driver's Tx queue. If that time is significantly greater when a wider channel (e.g., one with a bandwidth of 160 MHz) is used, the control systems and methods of the present disclosure may be configured to determine what the system may operate more efficiently and with greater overall throughput if the channel in operation is switched to a narrower channel (e.g., one with a bandwidth of 80 MHz). If switching to a pre-designated 80 MHz channel reduces the time that packets spend in the TX queue, it can then be determined that the correct choice had been made and this channel can remain active. If switching to one of the narrower channels does not improve the time or throughput, the control systems and methods may then determine that the other 80 MHz channel may be better and can switch to operating over this channel.

In some embodiments, the measurable sojourn time may also be related to other parameters, such as latency and jitter. By obtaining these various metrics, it may be possible to optimize the select of channels. Of course, the process of optimizing this selection may be based on predetermined techniques or algorithms and may therefore be modified based on user preferences or other restrictions or constraints. Thus, the process of optimizing may result in any combination of reduced sojourn time, reduced latency, reduced jitter, increased throughput, etc., which may typically enhance Quality of Experience (QoE) or other user metric. Measuring sojourn time, latency, and/or jitter may provide an accurate way to tell how well and consistently the Wi-Fi network is supporting the specific traffic flow.

However, it may be noted that these types of measurements may be difficult to obtain from typical Wi-Fi components. For instance, the packet flows may be handled by hardware accelerators. Hence, recording a time stamp on arrival and on departure may not be possible without pulling the flow out of the hardware accelerator, which would degrade performance. Therefore, tracking jitter and latency per traffic flow may not be considered. Instead, the systems and methods of the present disclosure may be configured to measure the Wi-Fi latency. There could be many flows served by a Wi-Fi radio of a Wi-Fi component. However, the embodiments described herein may only consider the overall latency for all traffic through the Wi-Fi component. In other cases, the embodiments may alternatively consider the traffic for each of the four Wi-Fi Multimedia (WMM) traffic classes. Also, the systems and methods of the present disclosure may make no distinction between whether the traffic is served to the Wi-Fi driver (or transmitter) by software or by a hardware accelerator. Instead, the embodiments are concerned with the delay of the packets once they are in the Wi-Fi queues.

Figure 9:
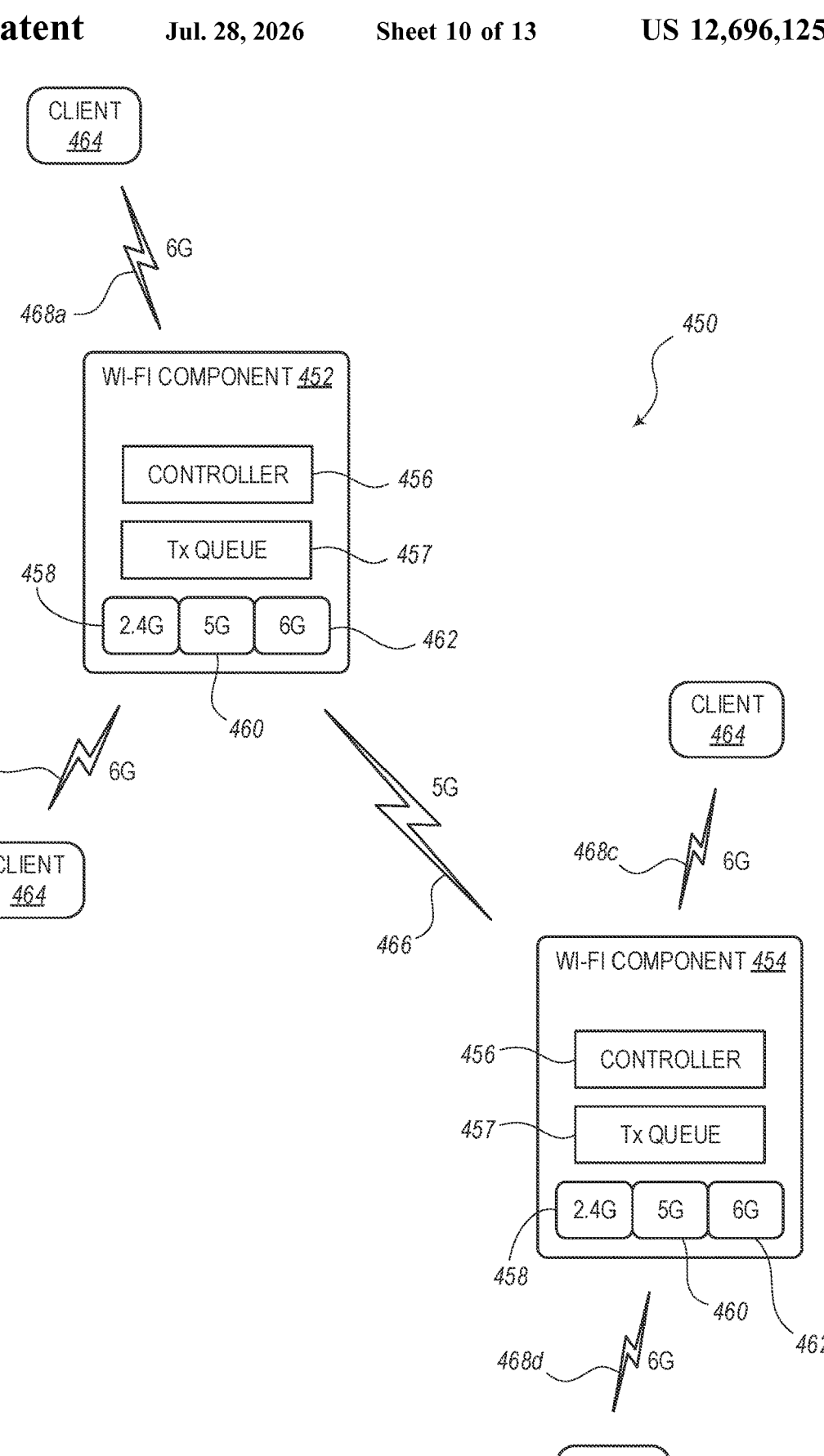
FIG. 9 is a diagram illustrating an embodiment of a Wi-Fi network.

FIG. 9 is a diagram illustrating an embodiment of a Wi-Fi network 450. In this embodiments, the Wi-Fi network 450 includes a first Wi-Fi component 452 and a second Wi-Fi component 454. For example, the first Wi-Fi component 452 may be configured as a gateway device connected via Ethernet to the Internet 12. The second Wi-Fi component 454 may be configured as a leaf device, mesh point device, node, etc. in wireless communication with the first Wi-Fi component 452 for extending the range of Wi-Fi availability within the Wi-Fi network 450. Each Wi-Fi component 452, 454 includes a controller 456, a transmitter (Tx) queue 457, and three radios. For example, the three radios may include a 2.4 GHz radio 458 for operation in the 2.4 GHz band, a 5 GHz radio 460 for operation in the 5 GHz band, and a 6 GHZ radio 462 for operation in the 6 GHz band.

In other embodiments, the three radios may be configured to operate at any radio frequency range, such as for enabling Wi-Fi communication according to any existing or future Wi-Fi protocols and standards. According to alternative embodiments, for example, the 2.4 GHz radio 458 may be configured with a wider range to enable operation in the 2.4 GHz band, the 5 GHz band, the 6 GHz band, and additional bands (e.g., future 7 GHz band and beyond). In this way, the 2.4 GHz band may be able to double up the channel selections in the 5 GHz band and/or 6 GHz band as needed (particularly in the future, particularly when the legacy 2.4 GHz band is utilized less often and is replaced increasingly by utilization in the 6 GHz band and beyond).

Also, the Wi-Fi network 450 shows a number of clients 464 (e.g., client devices, end user devices, etc.) that may be linked to one of the Wi-Fi components 452, 454. It should be noted that the Wi-Fi network 450 may include any number of Wi-Fi components wirelessly connected over "backhaul" links. The wireless (or wired) communication between the clients 464 and their respective Wi-Fi component 452, 454 is considered to be established over "fronthaul" links. In the illustrated embodiment, the Wi-Fi network 450 is arranged whereby a backhaul link 466 is established between the two Wi-Fi components 452, 454 and fronthaul links 468a, 468b, 468c, 468d are established between each client 464 and its corresponding Wi-Fi component 452, 454.

According to the various embodiments of the present disclosure, the Wi-Fi network 450 may be configured such that the backhaul link 466 may include communication in one frequency band (e.g., 5 GHz band) while the fronthaul links 468 may include communication in another frequency band (e.g., 6 GHz band). In this way, the Wi-Fi components 452, 454 may utilize their 5 GHz radios 460 for backhaul communication and utilize their 6 GHz radios 462 for fronthaul communication. As such, the two radios can operate simultaneously (or in parallel) and would require little or no queueing in the Tx queue 457. Again, one of the goals of the present disclosure is to minimize, as much as possible, the amount of time (i.e., sojourn time) that packets remain in the Tx queue 457 before they are transmitted from one Wi-Fi component 452, 454 to the other.

FIG. 10 is a flow diagram illustrating a process 500 for selecting Wi-Fi channels. The process 500 may be executed by any Wi-Fi component (e.g., Wi-Fi components 452, 454) operating in a Wi-Fi network (e.g., Wi-Fi network 450), or, alternatively, may be executed by a control device (e.g., cloud service 40, server 200, etc.) configured to provide control to the Wi-Fi network 450. For example, according to some embodiments, the Wi-Fi component 452, 454 may be an Access Point (AP) device, a pod, a mesh point device, a hub, a node, a leaf, a router, a gateway device, or other suitable device. As mentioned above, the Wi-Fi component may include at least one Wi-Fi radio (e.g., radios 458, 460, 462) and may include circuitry (e.g., controller 456) for performing certain functionality for the selection of channels and the controlling of the one or more radios for communicating over the selected channel or channels.

As shown in FIG. 10, the process 500 includes the step of obtaining a first measurement of a sojourn time associated with operating the Wi-Fi radio at a first Wi-Fi channel, as indicated in block 502. For example, the first Wi-Fi channel has a first bandwidth and the sojourn time, as described above, is a metric related to the length of time that packets are queued before being transmitted to another component in the Wi-Fi network. The process 500 also includes the step of obtaining one or more additional measurements of one or more sojourn times associated with operating the Wi-Fi radio at one or more additional Wi-Fi channels, as indicated in block 504. Each of the one or more additional Wi-Fi channels has a bandwidth that is different from the first bandwidth. Also, the process 500 includes the step of selecting a channel from among the first Wi-Fi channel and the one or more additional Wi-Fi channels based on the bandwidth and sojourn time of each respective channel, as indicated in block 506.

According to additional embodiments, the process 500 may further include the step of enabling the Wi-Fi radio to operate at the selected channel, as indicated in block 508. For example, the first measurement and the one or more additional measurements may be obtained in real time to enable the immediate operation of the Wi-Fi radio at the selected channel. Furthermore, after enabling the Wi-Fi radio to operate at the selected channel for a predetermined period of time, the process 500 may further include repeating the obtaining steps (blocks 502, 504) and selecting step (block 506) to obtain updated sojourn times and to re-select a channel from among the first Wi-Fi channel and the one or more additional Wi-Fi channels based on the bandwidth and the updated sojourn time of each channel, as indicated in block 510.

In addition, the one or more additional Wi-Fi channels (block 504) may specifically include a second Wi-Fi channel and a third Wi-Fi channel, wherein the bandwidth of each of the second and third Wi-Fi channels is narrower than the first bandwidth of the first Wi-Fi channel. For example, the first bandwidth may correlate to the 160 MHz channel shown in FIG. 8, whereby the second and third bandwidths may correlate to the 80 MHz channels. Thus, in this example, the bandwidth of each of the second and third Wi-Fi channels may be half of the first bandwidth. Also, as further demonstrated in the example of FIG. 8, the second and third Wi-Fi channels may be sub-channels of the first Wi-Fi channel. That is, in some cases, the second Wi-Fi channel (e.g., channel 71) may include frequencies in the lower half of the first Wi-Fi channel (e.g., channel 79) and the third Wi-Fi channel (e.g., channel 87) may include frequencies in the upper half of the first Wi-Fi channel.

In another example, the bandwidth of each of the second and third Wi-Fi channels is decreased from the first bandwidth via preamble puncturing. With Wi-Fi 7 and its new feature called preamble puncturing, it is now possible to adjust the channel bandwidth in increments of 20 Mhz without requiring it to be exactly half the bandwidth. Prior to Wi-Fi 7, the bandwidth was always halved: 160, 80, 40, 20. However, with Wi-Fi 7, it's now possible to configure a channel bandwidth that is 80, 160, or 320 MHz wide while allowing you to puncture out 20+ MHz in the middle. Here is an example:

Channel Config One: 320 MHz configured
Channel Config Two: 320 MHz configured with 40 MHz in the middle of it unused
Channel Config Three: 160 MHz configured
Channel Config Four: 160 MHz configured with 20 MHz in the middle of it unused The selecting step (block 506) may further include the step of analyzing quicker-throughput benefits related to each bandwidth and latency-reduction benefits inversely related to each sojourn time. Then, by weighting the bandwidth and the sojourn time measurements based on the analyzed benefits, the channel can be selected in order to optimize Quality of Experience (QoE). Again, the first Wi-Fi channel and the one or more additional Wi-Fi channels may be chosen from at least the channels available in the 2.4 GHz band, 5 GHz band, and 6 GHz band defined in the Wi-Fi 6E standard and Wi-Fi 7 standard. The first Wi-Fi channel may include a bandwidth equal to 40 MHz, 80 MHz, 160 MHz, or 320 MHz.

The process 500 may also include the step of obtaining application-level parameters based on a detection of an application running on one or more client devices in the Wi-Fi network, the application-level parameters including one or more of application-level latency, application-level jitter, and application traffic class. Then, the process 500 may include selecting the channel based on the bandwidth, sojourn time, and application-level parameters of each respective channel. The Wi-Fi radio described in the process 500 may include at least a chip (e.g., including a processor, the controller 456, etc.) and a transmitter queue (e.g., Tx queue 457), which may be installed on the chip. The sojourn time may be related to a queue depth in the transmitter queue or an amount of time that packets dwell within the transmitter queue as a result of latency, jitter, traffic delay, and/or interference in the Wi-Fi network. The chip of the Wi-Fi component 452, 454 may then be configured to perform channel selection. Each Wi-Fi components (e.g., Wi-Fi components 452, 454 and/or other backbone components in the Wi-Fi network) may be configured to transmit packets to the other Wi-Fi components in the Wi-Fi network over backhaul links. Transmission to one or more other components (e.g., clients 464) in the Wi-Fi network 450 may include a fronthaul transmission.

The embodiments of the present disclosure are therefore related to channel selection for the purpose of enhancing the QoE for the users, particularly to reduce latency in the Wi-Fi systems and networks. Based on the detected sojourn time, which is essentially related to the latency, it is possible to determine if another channel would reduce the sojourn time and thereby reduce latency. If latency can be reduced without significantly sacrificing bandwidth, then the new channel may provide better results. The latency, for example, may be the result of the interference cause by one or more nearby Wi-Fi components that operate over the same channel. The nearby devices may be components in the same residence (i.e., same Wi-Fi network) or may even be Wi-Fi devices that are being used in a neighbor's home.

As part of a Wi-Fi transmission, one of the things that can be controlled, for example, is the bandwidth of Wi-Fi packets. For example, in the 5 GHz band, the most commonly used bandwidth is 80 MHz, which is also associated with four 20 MHz channels operating in parallel, as shown in FIG. 7. What this means is that while two of the channels might be clear (e.g., free from interference), the other two channels might be more heavily used by a neighbor and cause interference. However, a packet may normally need to wait in the Tx queue 457 before the radio (e.g., one of radios 458, 460, 462) can transmit over the 80 MHz channel. Normally, a controller may be able to transmit the packet faster (i.e., it will take less air time and it will get there quicker), but it might have to wait longer because those other two channels may be in use. However, as described with respect to the embodiments of the present disclosure, the controller 456 may be configured to determine if the slower channel may be better, in that it may be able to start the transmission sooner. Thus, the overall transmission time might be less.

Many vendors in this field may look at that utilization of the other channels and decide of when to drop down to using two channels instead of four when those other two are busy. They may make some decisions around when to transmit slower, but sooner. The embodiments of the present disclosure take advantage of latency and jitter information, which may be related to the sojourn time. If the controller 456 determines that there are bursts of interference on those two channels, causing jitter or latency, and if it knows that a latency-sensitive application is being used, the controller 456 can take advantage of the channel bandwidth. Even though the overall throughput might be lower, the controller 456 may drop the bandwidth down to reduce latency for these latency-sensitive applications (e.g., gaming applications, VoIP applications, etc.).

By default, the conventional systems are unable to know which channel may be better. Some conventional Wi-Fi chips may provide their own mechanisms for channel selection, but even these are only able to make a best guess type of selection. Thus, these conventional systems do not often provide successful selections. Sometimes they guess correctly, sometimes not. By implementing the controller 456 of the present disclosure, it is possible to detect metrics related to jitter and latency measurements that provide successful channel selection. The embodiments of the present disclosure measure the sojourn time and, from there, can measure other corresponding metrics on the fly to be able to accurately and in real-time provide essentially optimized channel selection for reducing latency and providing greater QoE. A Wi-Fi chip embedded of the Wi-Fi component (or controller 456) can measure latency, queue depth, sojourn time (i.e., how long are packets waiting before they go on the air), etc. These metrics are typically not available on conventional Wi-Fi components. Thus, without proper logic, it can be quite complex to implement the decision making and respond to latency metrics in real time.

In the present embodiments, once the latency measurements are derived, the controller can quickly determine bandwidth and latency penalty and weight these two factors appropriately, using any suitable techniques, algorithms, calculations, etc. For example, while transmitting at a full 160 MHz, it may be determined that the packets must wait 10 ms until all the channels are cleared. While transmitting at 80 MHz, the controller 456 may determine that the packets have to wait a much shorter time (e.g., 1 ms). In this case, the controller 456 may determine that the overall better channel would be the better one and may then switch to the 80 MHz channel. However, in another example, suppose the latency is almost the same for both the 160 MHz channel and 80 MHz channel. In this case, the controller 456 may determine that going with the 160 MHz channel only costs a relatively insignificant latency penalty and, although it may be necessary to wait just a bit longer, it would still be beneficial to utilize the 160 MHz channel to get twice the throughput through those channels. This way, the controller 456 can quickly calculate which channel is better. That is, it may choose a wider bandwidth that may be subject to more interference as a result of latency or it may choose a narrower bandwidth that may be subject to less interference. Thus, the measured sojourn time (used as a factor for deducing the latency) can be used, along with the actual bandwidth of the channel, to help the controller 456 make a confident decision about which channel is better.

By measuring how long these packets are queued before they are transmitted, the controller derived the latency metric. Also, the sojourn time and latency metrics may also be dependent on other factors, such as the different types of packets that are transmitted. Instead of simply looking for different packets and averaging the delay, the controller 456 can analyze the different queues for different packets based on a user-defined prioritization. The category of packets given the lowest priority may usually have a slightly higher latency. Thus, the controller 456 may use this priority scheme in its calculations for determining latency.

In particular, the measurements may also be related to calculations based on application-level latency. For example, suppose a user is on a Zoom call. Throughout the call, the controller 456 may be configured to measure the sojourn time (or latency) and perform channel selection procedures periodically. The channel selection may be performed, the selected channel can be utilized, and then the process can be repeated to determine if the latency factors have changed and switch back to the other channel if it is determined that that channel is better. For example, the controller 456 may test the system by first switching to the wider channel (e.g., 160 MHz bandwidth channel). At this channel, the controller 456 can measure the latency for a predetermined time period (e.g., one second). Then, the controller 456 may continue the test by switching to the 80 MHz channel and measure the latency for the predetermined time period. Then, based on a calculated that take both metrics (e.g., bandwidth and latency) into account, the controller 456 can make an intelligent choice about which channel provide better results.

In addition, the controller 456 can take other factors into account, such as application-level latency, application-level jitter, application traffic class, etc. Some metrics may be optional in some platforms. Thus, the controller 456 can use whatever metrics may be available, according to the particular system or Wi-Fi components, and process these metrics to determine whether a smaller bandwidth transmission would improve the overall quality by reducing the latency. It may be noted that the application-level measurements, as opposed to physical layer (PHY) metrics, may be more useful in these embodiments, which may be related to the implementations of OpenSync described above. OpenSync may include a packet inspection or packet detection type of process, which may use a virtual switch to see into the packets and find out what type of application is actively running and causing packets to be transmitted through the Wi-Fi network. OpenSync may also use another step, referred to as application detection, for looking at packets flowing through the system for identifying or categorizing the active applications. Also, in some respects, there may be two primary aspects to application detection. One aspect uses a bytecode engine that runs in OpenSync. A more sensitive aspect uses a signature compiler. An operator can write special code that gets compiled into certain signatures, which then can be converted into bytecode that the bytecode engine can run.

Therefore, these embodiments combine two primary things. The controller 456 can simply obtain this sojourn time and programmatically find the optimal bandwidth and make a change to another bandwidth under consideration if it provides better results. The jitter and other metrics may also be used to improve QoE. For example, along with sojourn time, the application-level metrics could be additional inputs that can control the selection. The controller 456 can pre-designate whether to switch to a channel with a higher bandwidth or one or more channels having a lower bandwidth (e.g., upper and lower). In this respect, there may be three choices to select from.

Since the embodiments described herein are generic, it should be noted that they can be applied to many different Wi-Fi situations. For example, in legacy devices, the systems and methods described herein may support 40 MHz channels, where lower 20 MHz channels may be selected as well (e.g., upper 20 MHz or lower 20 MHz). With later generations and future generations of Wi-Fi, greater bandwidths (e.g., 80 MHz, 160 MHz, 320 MHz, and beyond) may be used as a primary higher channel, where the controller 456 can then select corresponding 40 MHz, 80 MHz, 160 MHz channels, and beyond. At present, 160 MHz may be widely supported, but the Wi-Fi 7 standard and beyond may allow for other scenarios as would be understood by one of ordinary skill in this field of technology.

Also, some chipsets allow split-channel operation, such as 80+80 (total 160) or 160+160 (total 320). In other words, the bandwidth can be split up across two different segments within the given frequency band range. For example 160 MHz Operation could be:

36/160 (using channels 36 through 64)=>total of 160 Mhz or: 36/80+149/80 (using channels 36 through 48 and 149 through 161)=>total of 160 Mhz

§ 6.0 DESIGNATING RADIOS TO OPERATE IN DIFFERENT Wi-Fi FREQUENCY BANDS IN BACKHAUL AND FRONTHAUL LINKS

Referring again to FIG. 9, suppose that the first Wi-Fi component 452 is a gateway device, modem, or router configured to connect the Wi-Fi network 450 to the Internet 12 and suppose that the second Wi-Fi component 454 is a leaf node configured to communicate with the gateway device via the backhaul link 466 while communicating with one or more clients 464 via fronthaul links 468c and 468d. By configuring one of the radios (e.g., the 5 GHz radio 460) to operate over the backhaul link 466 and by configured another one of the radios (e.g., the 6 GHz radio 462) to operate over the fronthaul links 468c, 468d, the leaf node (i.e., the second Wi-Fi component 454) is able to avoid duplicity of receiving and transmitting functions. That is, the action of receiving packets along one band (e.g., the 5 GHz band) can be performed in parallel with the action of transmitting packets along another band (e.g., the 6 GHz band). In this case, the leaf node is able to achieve "full-rate" without the need to queue packets as would be the case if transmitting and receiving were performed on the same Wi-Fi channel.

Therefore, according to additional embodiments with respect to FIG. 9, the Wi-Fi network 450 can have multiple Wi-Fi components 452, 454 configured to communicate with each other over the backhaul link 466. Each Wi-Fi component 452, 454 is configured to communicate with one or more client devices 464 over one or more fronthaul link 468. In particular, a leaf node (e.g., the Wi-Fi component 454) includes a first radio configured for communication over one or more backhaul links and a second radio configured for communication with over one or more fronthaul links.

The Wi-Fi network 450 may be operated with an original topology, where the radios 458, 460, 462, Wi-Fi bands, backhaul links, and fronthaul links are configured according to a known arrangement. While operating in this original topology, the controller 456 may be configured to detect when a new client device 464 is first connected to the Wi-Fi component (e.g., Wi-Fi component 454) over a new fronthaul link 468. Upon detection of this new wireless (or wired) connection with this newly discovered client device 464, the controller 456 is configured to determine the Wi-Fi communication capabilities of the client device 464, such as its ability to operate in one or more Wi-Fi bands (e.g., the 2.4 GHz band, the 5 GHz band, 6 GHz band, etc.). Based on the Wi-Fi communication capabilities, the controller is configured to determine whether the original topology of the Wi-Fi network or a new topology of the Wi-Fi network would result in greater throughput of packets through the Wi-Fi network. For example, a new topology may include different configurations of radios, Wi-Fi bands, one or more backhaul links, and one or more fronthaul links. When it is determined that the new topology would result in greater throughput, the controller 456 may be configured adjust the topology by setting a first Wi-Fi channel (e.g., in a first Wi-Fi band) for the backhaul link and setting a second Wi-Fi channel (e.g., in a second Wi-Fi band) for the fronthaul link.

Again, the radios 458, 460, 462 may operate in different Wi-Fi bands and may be configured to communicate signals over one channel within that respective Wi-Fi band. In other embodiments, the radios 458, 460, 462 may operate at different channels of the same Wi-Fi band. In particular, because of the greater availability of channels in the 5 GHz band and 6 GHz band, the first Wi-Fi channel described here may be one channel in one of the 5 GHz band or 6 GHz band as defined at least in the Wi-Fi 6E and Wi-Fi 7 standards, while the second Wi-Fi channel described here may be one channel in the other of the 5 GHz band or 6 GHz band.

For example, according to one embodiment, if a new client device 464 capable of operating in the 6 GHz band (in addition to the 2.4 GHz and 5 GHz bands) is newly connected to the Wi-Fi component 454, the controller 456 may be configured to switch the backhaul 466 to 5 GHz (or 2.4 GHz). However, if a new client device 464 is newly connected, but is not capable of operating in the 6 GHz band, but can operate in the 2.4 GHz and 5 GHz bands, then the controller 456 may switch the backhaul 466 to 6 GHz. This, of course, represents a simple control algorithm for configuring the backhaul 466 and fronthaul 468 to different bands (and consequently different channels). As such, the leaf node (e.g., Wi-Fi component 454) can utilize two radios (e.g., the 5 GHz radio 460 and 6 GHz radio 462) for operation in parallel for receiving packets along either the backhaul 466 or fronthaul 468 while also transmitting these packets along the other of the backhaul 466 or fronthaul 468. Again, this allows for full-rate operation without delay and provides greater QoE for the user.

In some embodiments, a third radio (e.g., the 2.4 GHz radio 458 in this scenario) may also be implemented. For example, if one client 464 is connected over fronthaul link 468c using the 5 GHz radio 460 or 6 GHz radio 462 and if a newly connected client device 464 is connected over a new fronthaul link (e.g., link 468d), the controller 456 may configure this third radio (e.g., the 2.4 GHz radio 458) to operate over the new fronthaul link 468d. This configuration may also allow parallel operation without interference.

Although one solution may include configuring the backhaul and fronthaul to operate at different Wi-Fi bands, the controller 456 may consider other factors when deciding the radio usage and backhaul and fronthaul configurations. For example, one additional consideration may include the streaming capabilities of the radios of the Wi-Fi components, which may include a 2×2 Multi-Input, Multi-Output (MIMO) configuration, 3×3 MIMO configuration, a 4×4 MIMO configuration, etc. Other considerations, for example, may include a) where the client device is connected (i.e., to which Wi-Fi component the client device is connected), b) which radio (of the leaf node) that the client device 464 is associated with, c) which band (of the leaf node) that the client device is associated with, and d) the number of client devices on each band connected to the leaf node. Thus, by using any combination of these various factors, the controller 456 may be adapted to properly configure the radio and establish the backhaul and fronthaul links accordingly. The optimal configuration of the radios and communication links may result in a reduction in the time sharing of radios for communication on backhaul and fronthaul and may also reduce the sojourn time that packets are kept in a transmitter queue 457. Also, by properly maintaining optimal configurations, the Wi-Fi network 450 may essentially maintain full-rate operation through the leaf node using different Wi-Fi bands for backhaul and fronthaul.

Furthermore, the controller 456 of the gateway device (e.g., Wi-Fi component 452) may be configured to perform the processes described above. As a result, the controller 456 may decide to keep a current topology or to modify the topology to a new topology that better utilizes the three radios on each Wi-Fi component. The preferred topology in this case may then be communicated to other Wi-Fi components (e.g., the one or more leaf nodes in the Wi-Fi network 450). Thus, the gateway device can perform the initial detection and may then establish the topologies and designate the proper bands for the backhaul and fronthaul links. This topology information may then be sent to the leaf nodes to allow them to get on board so as to utilize their radios for the backhaul and fronthaul links.

Figure 11A:
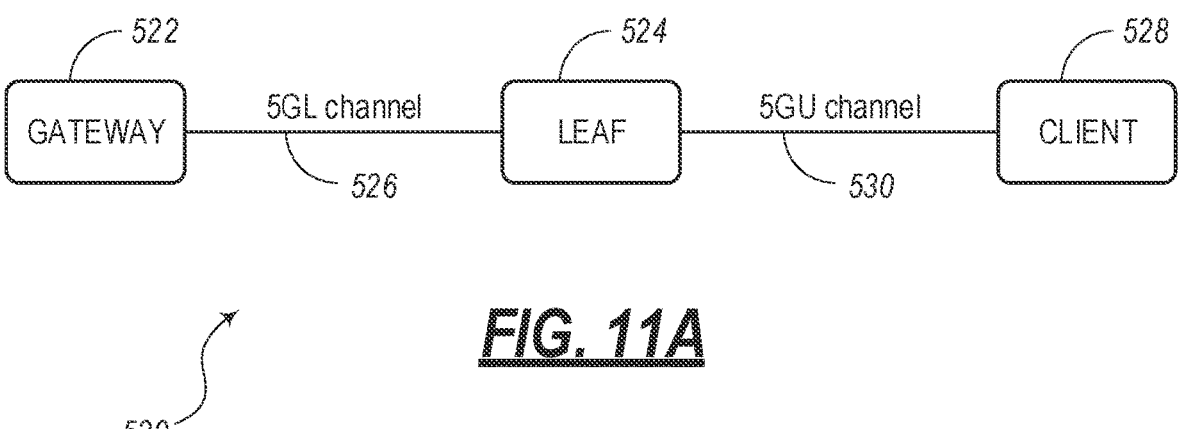
FIG. 11A is a diagram illustrating an example of a Wi-Fi network setup according to a previous implementation.

FIG. 11A is a diagram illustrating an example of a Wi-Fi network setup 520 according to a previous implementation provided by the same Applicant. In previous implementations associated with the present Applicant, Wi-Fi components were developed with dual-band, tri-radio operation. That is, three radios were configured such that one radio operated in the 2.4 GHz band and the other two radios were configured to operate in the 5 GHz band. The two high-capacity bands were sub-bands of the 5 GHz band, one at lower frequency channels and the other at higher frequency channels. This allowed an optimizer to select an optimal backhaul band. By putting a home Virtual Access Point (VAP) of a leaf node on the other sub-band, the optimizer was able to guarantee full rate throughout to any 5 GHz client device at the leaf node. In the illustrated example of FIG. 11A, the Wi-Fi network setup 520 includes a gateway 522 connected to a leaf 524 via a first link 526. In this case, the first link 526 is configured for operation over a channel in a lower portion of the 5 GHz spectrum, which is referred to herein as a 5GL channel. The Wi-Fi network setup 520 also includes the leaf 524 connected to a client 528 via a second link 530. In this case, the second link 530 is configured to operation over a channel in an upper portion of the 5 GHz spectrum, which is referred to herein as a 5GH channel.

However, as Wi-Fi 6E opens up new spectrum that includes the 6 GHz band, as shown in FIG. 7, the three radios are now needed for operation in all three bands. Thus, instead of 5GL and 5GH channels, the Wi-Fi components are configured such that one radio is used in the 2.4 GHz band, one radio is used in the 5 GHz band, and one radio is used in the 6 GHz band. Thus, Wi-Fi components capable of this arrangement may be considered as true tri-band, tri-radio devices. However, the devices may be redesigned such that they no long operate in upper and lower portions of one band, but instead may operate each radio in a different bands. However, in some embodiments, as mentioned above, the 2.4 GHz radio may be converted to be able to operate in any of the 2.4 GHz band, 5 GHz band, and 6 GHz band as new client devices with greater communication capabilities are newly added in the Wi-Fi networks. Thus, this third radio may be flexible for dual operation in one or more bands, such as lower and upper portions of either the 5 GHz band or 6 GHz band.

Figure 11B:
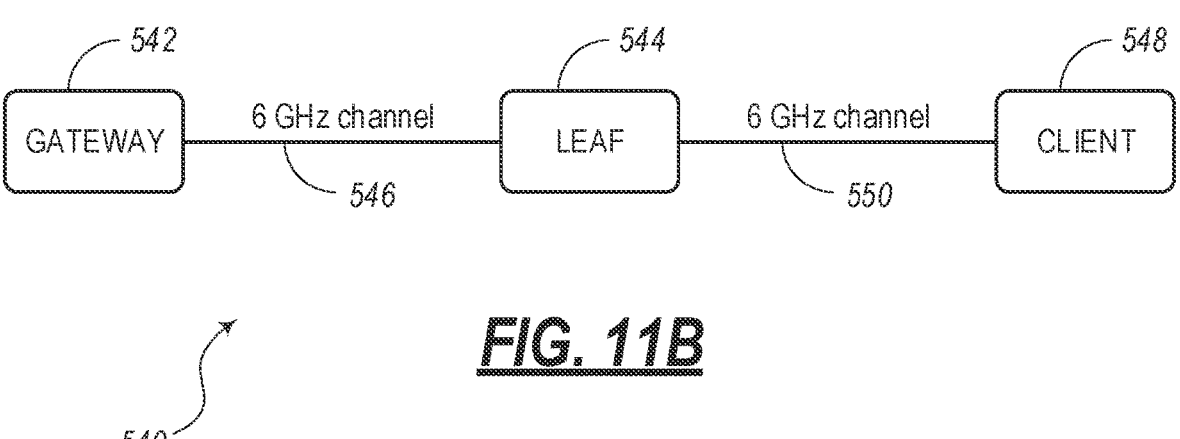
FIG. 11B is a diagram illustrating an example of another Wi-Fi network setup that is configured to enable communication over the 6 GHz band.

FIG. 11B is a diagram illustrating an example of another Wi-Fi network setup 540 that is configured to enable communication over the 6 GHz band. In the illustrated example of FIG. 11B, the Wi-Fi network setup 540 includes a gateway 542 connected to a leaf 544 via a first link 546. In this case, the first link 546 is configured for operation over a 6 GHz channel. The Wi-Fi network setup 540 also includes the leaf 544 connected to a client 548 via a second link 550. In this case, the client 548 may be 6 GHz capable. Hence, the second link 550 may be configured to operate over 6 GHz as well. Thus, the previous solution to this setup 540 may result in delays if both the links 546 and 550 operate in the same channel. Again, the leaf 544 would need to queue the packets between receiving and transmitting steps, which causes latency in the Wi-Fi network.

An optimizer may still choose the backhaul channel (e.g., the 6 GHz channel on link 546). However, the client 548 might also connect to the leaf 544 in the same 6 GHz band. Assuming similar capacity of the 5 GHz and 6 GHz radios, this Wi-Fi network setup 540 would not normally result in an optimal configuration since the leaf 544 would be repeating the 6 GHz channel.

Therefore, according to the embodiments of the present disclosure, the Wi-Fi components (e.g., gateway 542 and leaf 544) may be configured in order to establish parallel links per node. This may be achieved by taking advantage of the Wi-Fi 7 features as well as standards beyond Wi-Fi 7 that may be developed in the future. Then:

1. The gateway 542 may be configured to know which client 548 the downlink traffic is destined for.

2. Using an intelligent controller (e.g., controller 456, server of the cloud service 40, server 200, etc.), the gateway 542 may be configured to know in which band the client 548 is connected at the leaf 544. In this example, this connection is along the second link 550, which may be configured in the 6 GHz band.

3. The gateway 542 may be configured to choose to direct all downlink traffic to the leaf 544 on a band that is different from the one used by the client via the second link 550. For example, the gateway 542 may preferably choose the 5 GHz band in this case, although the 2.4 GHz band may also be selected, assuming that the client 548 uses the 6 GHz band.

4. The traffic arriving at the leaf 544 via the link 546 in on an alternate band (e.g., the 5 GHz band), which then gets sent to the client 548 via link 550 on the client enacted band (e.g., 6 GHz) with no repeating and at full line rate.

Therefore, according to various embodiments, a Wi-Fi component may be arranged in a Wi-Fi network having a current topology that enables communication with another Wi-Fi component over a backhaul link. The Wi-Fi component may include a first radio operating in a first Wi-Fi band and a second radio operating in a second Wi-Fi band. Also, the Wi-Fi component may include a control circuit (e.g., controller 456) configured to perform the following steps. The control circuit may be configured to detect when a client device connects to the Wi-Fi component over a new fronthaul link and determine the Wi-Fi communication capabilities of the client device. Then, based on the Wi-Fi communication capabilities, the control circuit may determine which one of the current topology of the Wi-Fi network and a new topology of the Wi-Fi network would result in greater throughput of packets through the Wi-Fi network. When it is determined that the new topology would result in greater throughput, the control circuit may adjust the topology by designating one of the first radio and second radio for communication over the backhaul link and designating the other of the first radio and second radio for communication over the new fronthaul link.

Figure 12:
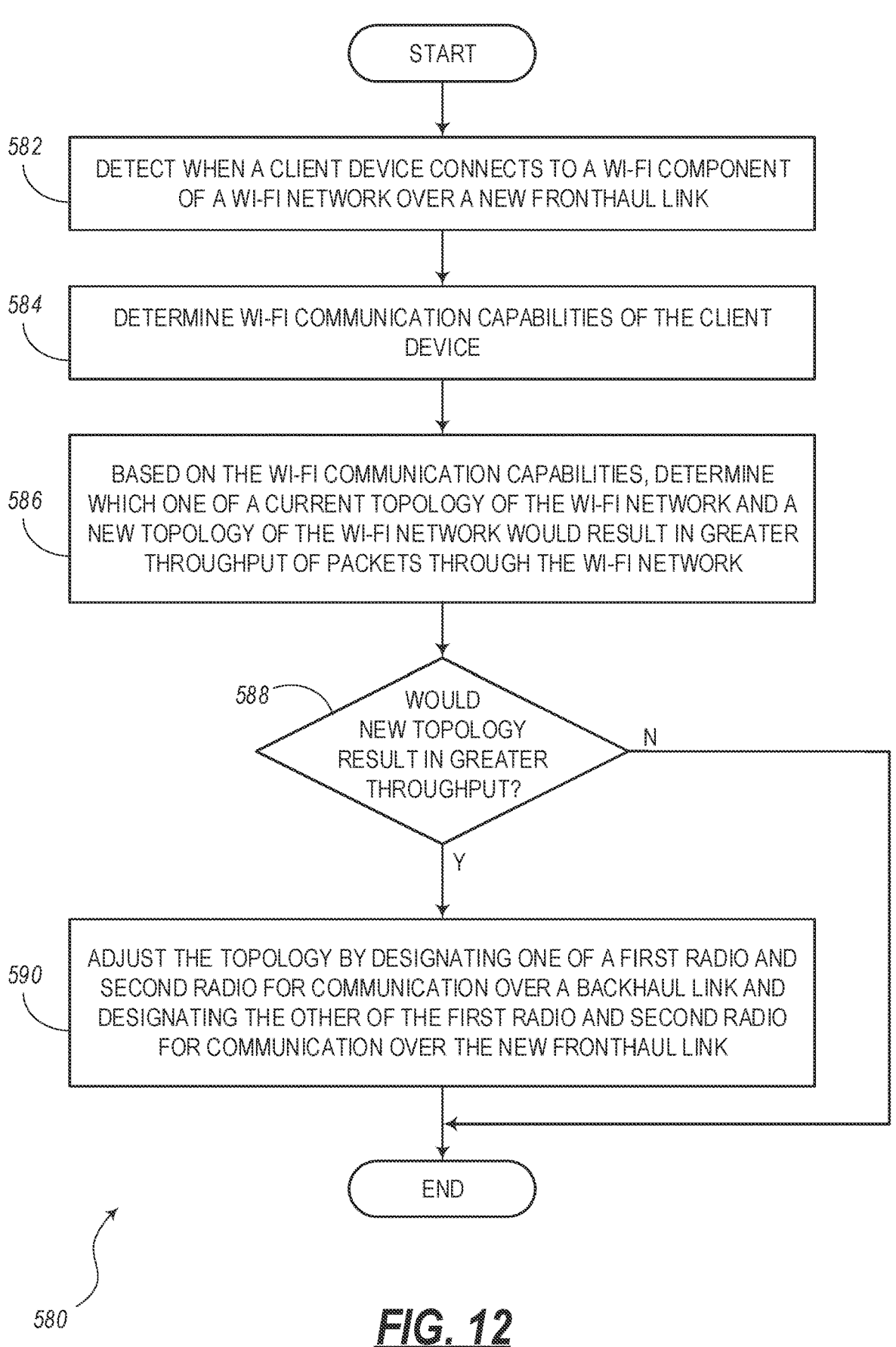
FIG. 12 is a flow diagram illustrating a process that may be executed by the Wi-Fi component.

FIG. 12 is a flow diagram illustrating a process 580 that may be executed by the Wi-Fi component. The process 580 includes detecting when a client device (e.g., client 548) connects to a Wi-Fi component (e.g., leaf 544) over a new fronthaul link (e.g., link 550), as indicated in block 582. The process 580 further includes determining the Wi-Fi communication capabilities of the client device (e.g., client 548), as indicated in block 584. Then, based on the Wi-Fi communication capabilities, the process 580 includes the step of determining which one of the current topology of the Wi-Fi network and a new topology of the Wi-Fi network would result in greater throughput of packets through the Wi-Fi network, as indicated in block 586. The process 580 also includes recognizing whether the new topology would result in greater throughput, as indicated in condition block 588. If not, then the current topology remains in place and the process 580 ends. Otherwise, when it is determined in condition block 588 that the new topology would indeed result in greater throughput, then the process 580 proceeds to block 590, which includes the step of adjusting the topology by designating one of the first radio and second radio for communication over the backhaul link and designating the other of the first radio and second radio for communication over the new fronthaul link.

According to additional embodiments, the process 580 may further include the step of causing the first radio to operate at a first channel in the first Wi-Fi band and causing the second radio to operate at a second channel in the second Wi-Fi band. For example, the first Wi-Fi band may include at least a portion of the 5 GHz band as defined in the Wi-Fi 6E and Wi-Fi 7 standards and the second Wi-Fi band may include at least a portion of the 6 GHz band as defined in the Wi-Fi 6E and Wi-Fi 7 standards. When it is determined that the Wi-Fi communication capabilities of the client device allows operation in the 6 GHz band, the process 580 may include designating the first radio for communication over the backhaul link and designating the second radio for communication over the new fronthaul link. When it is determined that the Wi-Fi communication capabilities of the client device do not allow operation in the 6 GHz band, the process 580 may include designating the second radio for communication over the backhaul link and designating the first radio for communication over the new fronthaul link.

In some embodiments, the Wi-Fi component may include a third radio operating in a third Wi-Fi band that is different from the first and second Wi-Fi bands. The third radio may be configured for communication over one or more additional fronthaul links. In some embodiments, the third radio may be an adjustable radio operating at any channel in one or more of the 2.4 GHz band, 5 GHz band, and 6 GHz band as defined in the Wi-Fi 6E and Wi-Fi 7 standards.

Furthermore, the process 580 may determine which one of the current topology and the new topology would result in greater throughput (block 586) based on one or more of: a) multiple parallel streaming capabilities of the client device, b) one or more radios of the client device, c) a location within the Wi-Fi network of a Wi-Fi component to which the client device is connected, and d) a number of other client devices connected to the Wi-Fi component to which the client device is connected. The process 580 may also include the step of adjusting the topology (block 590) in order to reduce the occurrence of one of the first and second radios being forced to share time for communication on both the backhaul and fronthaul links and in order to reduce a sojourn time that packets are stored in a transmitter queue.

The process 580 may be executed by a Wi-Fi component. In some embodiments, the Wi-Fi component performing the steps of the process 580 may be a gateway device (e.g., gateway 542). The process 580 may include the step of sending topology information to one or more leaf nodes for selecting one of the first and second radios to establish one or more backhaul links and for instructing the one or more leaf nodes to utilize the other of the first and second radios to establish respective fronthaul links. In alternative embodiments, the Wi-Fi component performing the steps of the process 580 may be a leaf node (e.g., leaf 544) and the other Wi-Fi component may be the gateway device (e.g., gateway 542) or another leaf node. The process 580 may also include the step of detecting when the client device connects to the leaf node over the new fronthaul link after a separate optimization process that establishes the current topology, whereby the step of selecting the new topology may include a re-optimization process.

With the advances in Wi-Fi allowing a much greater spectrum with many available channels, the embodiments of the present disclosure are configured to enable the use of new device capable of operation at 6 GHz and designating backhaul links to allow 6 GHz fronthaul links between these new devices and corresponding leaves. However, before new 6 GHz capable devices are incorporated into Wi-Fi network, it should be understood that, currently, about 90% of device being used today are not 6 GHz capable, but instead are able to operate in the 5 GHz band. Therefore, the embodiments of the present disclosure are configured to accommodate both scenarios, thereby allowing these newer device to take advantage of the greater spectrum flexible, while also allowing legacy devices to continue to operate optimally as well.

It may also be noted that an optimizer (e.g., controller 456) may be configured to switch the backhaul and fronthaul to two different bands. However, this is not done blindly since other factors may come into play. If the streaming capabilities of the radios of the Wi-Fi components are 6 GHz band 4×4 MIMO radio, for example, then this may affect the decision of this radio to use in various cases. Also, an initial optimization may assume that the client would have certain capabilities (e.g., based on previously connected clients). Then, in real time, the control circuit may determine if the newly connected client is the same as what was expected or if it is a different type of client. If it is different, the control circuit may readjust the topology accordingly. In other words, the processes described herein may be configured to perform a "client aware optimization" procedure using the calculations and detections of various conditions and metrics in the system. The optimization may be run and re-run as needed to maintain an optimal network configuration by taking constraints and new information into account.

§ 7.0 CONCLUSION

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

The foregoing sections include headers for various embodiments and those skilled in the art will appreciate these various embodiments may be used in combination with one another as well as individually. Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Wi-Fi component configured to operate in a Wi-Fi network, the Wi-Fi component comprising at least a Wi-Fi radio and circuitry, the circuitry configured to execute the steps of:

obtaining a first measurement of a sojourn time associated with operating the Wi-Fi radio at a first Wi-Fi channel, the first Wi-Fi channel having a first bandwidth, wherein the sojourn time is a metric related to the length of time that packets are queued before being transmitted to another component in the Wi-Fi network;

obtaining one or more additional measurements of one or more sojourn times associated with operating the Wi-Fi radio at one or more additional Wi-Fi channels, each of the one or more additional Wi-Fi channels having a bandwidth that is different from the first bandwidth;

calculating, for each channel, a respective throughput based on the bandwidth and sojourn time of the respective channel;

determining, for each channel, a respective quality metric based on at least the calculated throughput;

comparing the quality metrics of the first Wi-Fi channel and the one or more additional Wi-Fi channels; and selecting a channel from among the first Wi-Fi channel and the one or more additional Wi-Fi channels based on the comparison of the quality metrics, the selected channel having a highest quality metric among the compared channels.

2. The Wi-Fi component of claim 1, wherein the circuitry is further configured to execute the step of enabling the Wi-Fi radio to operate at the selected channel.

3. The Wi-Fi component of claim 2, wherein the first measurement and the one or more additional measurements are obtained in real time to enable the immediate operation of the Wi-Fi radio at the selected channel.

4. The Wi-Fi component of claim 3, wherein, after enabling the Wi-Fi radio to operate at the selected channel for a predetermined period of time, the circuitry is further configured to execute the steps of:

repeating the obtaining steps to obtain updated sojourn times; and repeating the selecting step to re-select a channel from among the first Wi-Fi channel and the one or more additional Wi-Fi channels based on the bandwidth and the updated sojourn time of each of the respective channels.

5. The Wi-Fi component of claim 1, wherein the one or more additional Wi-Fi channels include a second Wi-Fi channel and a third Wi-Fi channel, wherein the bandwidth of each of the second and third Wi-Fi channels is narrower than the first bandwidth of the first Wi-Fi channel.

6. The Wi-Fi component of claim 5, wherein the bandwidth of each of the second and third Wi-Fi channels is half of the first bandwidth.

7. The Wi-Fi component of claim 5, wherein the bandwidth of each of the second and third Wi-Fi channels is decreased from the first bandwidth via preamble puncturing.

8. The Wi-Fi component of claim 1, wherein the selecting step further includes the steps of:

analyzing quicker-throughput benefits related to each bandwidth and latency-reduction benefits inversely related to each sojourn time; and weighting the bandwidth and the sojourn time measurements based on the analyzed benefits in order to optimize Quality of Experience (QoE).

9. The Wi-Fi component of claim 1, wherein the first Wi-Fi channel and the one or more additional Wi-Fi channels are chosen from at least the channels available in the 2.4 GHz band, 5 GHz band, and 6 GHz band defined in the Wi-Fi 6E standard and Wi-Fi 7 standard, and wherein the first Wi-Fi channel includes a bandwidth equal to 40 MHz, 80 MHz, 160 MHz, 320 MHz, including with or without split-channel operation.

10. The Wi-Fi component of claim 1, wherein the circuitry is further configured to execute the steps of:

obtaining application-level parameters based on a detection of an application running on one or more client devices in the Wi-Fi network, the application-level parameters including one or more of application-level latency, application-level jitter, and application traffic class; and selecting the channel based on the bandwidth, sojourn time, and application-level parameters of each respective channel.

11. The Wi-Fi component of claim 1, wherein the Wi-Fi radio includes at least a chip and a transmitter queue, wherein the sojourn time is related to a queue depth in the transmitter queue or an amount of time that packets dwell within the transmitter queue as a result of latency, jitter, traffic delay, and/or interference in the Wi-Fi network, and wherein the chip is configured to perform channel selection.

12. The Wi-Fi component of claim 1, wherein transmission to one or more other components in the Wi-Fi network includes a fronthaul transmission between the Wi-Fi component and one or more client devices in the Wi-Fi network or a backhaul transmission between the Wi-Fi component and another backbone component in the Wi-Fi network.

13. The Wi-Fi component of claim 1, wherein the Wi-Fi component is an Access Point (AP) device, a pod, a mesh point device, a hub, a node, a leaf, a router, or a gateway device.

14. A method comprising the steps of:

obtaining a first measurement of a sojourn time associated with operating a Wi-Fi radio at a first Wi-Fi channel, the first Wi-Fi channel having a first bandwidth, wherein the sojourn time is a metric related to the length of time that packets are queued before being transmitted within a Wi-Fi network;

obtaining one or more additional measurements of one or more sojourn times associated with operating the Wi-Fi radio at one or more additional Wi-Fi channels, each of the one or more additional Wi-Fi channels having a bandwidth that is different from the first bandwidth;

calculating, for each channel, a respective throughput based on the bandwidth and sojourn time of the respective channel;

determining, for each channel, a respective quality metric based on at least the calculated throughput;

comparing the quality metrics of the first Wi-Fi channel and the one or more additional Wi-Fi channels; and selecting a channel from among the first Wi-Fi channel and the one or more additional Wi-Fi channels based on the comparison of the quality metrics, the selected channel having a highest quality metric among the compared channels.

15. The method of claim 14, further comprising the step of enabling the Wi-Fi radio to operate at the selected channel.

16. The method of claim 15, wherein the first measurement and the one or more additional measurements are obtained in real time to enable the immediate operation of the Wi-Fi radio at the selected channel.

17. The method of claim 16, wherein, after enabling the Wi-Fi radio to operate at the selected channel for a predetermined period of time, the method further comprises the steps of:

repeating the obtaining steps to obtain updated sojourn times; and repeating the selecting step to re-select a channel from among the first Wi-Fi channel and the one or more additional Wi-Fi channels based on the bandwidth and the updated sojourn time of each of the respective channels.

18. The method of claim 14, wherein the one or more additional Wi-Fi channels include a second Wi-Fi channel and a third Wi-Fi channel, wherein the bandwidth of each of the second and third Wi-Fi channels is narrower than the first bandwidth of the first Wi-Fi channel.

19. The method of claim 18, wherein the bandwidth of each of the second and third Wi-Fi channels is half of the first bandwidth.

20. The method of claim 18, wherein the bandwidth of each of the second and third Wi-Fi channels is decreased from the first bandwidth via preamble puncturing.

* * * * *